United States Patent
Wrathall

(10) Patent No.: US 6,724,257 B2
(45) Date of Patent: Apr. 20, 2004

(54) ERROR AMPLIFIER CIRCUIT

(75) Inventor: Robert S. Wrathall, Scotts Valley, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 10/210,696

(22) Filed: Jul. 31, 2002

(65) Prior Publication Data

US 2004/0021518 A1 Feb. 5, 2004

(51) Int. Cl.⁷ .............................. H03F 3/45; H03F 1/22
(52) U.S. Cl. ................................ 330/253; 330/311
(58) Field of Search ................................ 330/253, 311

(56) References Cited

U.S. PATENT DOCUMENTS

| | | | |
|---|---|---|---|
| 4,823,070 A | 4/1989 | Nelson | 323/285 |
| 5,381,113 A * | 1/1995 | Kimura | 330/253 |
| 5,382,918 A | 1/1995 | Yamatake | 330/260 |
| 5,514,947 A | 5/1996 | Berg | 323/282 |
| 5,559,423 A | 9/1996 | Harman | 323/277 |
| 5,631,606 A * | 5/1997 | Tran | 330/253 |
| 5,731,739 A * | 3/1998 | Ho | 330/253 |
| 5,770,940 A | 6/1998 | Goder | 323/282 |
| 5,774,021 A | 6/1998 | Szepesi et al. | 330/27 |
| 5,856,739 A | 1/1999 | Trica | 323/222 |
| 5,889,393 A | 3/1999 | Wrathall | 323/282 |
| 5,894,243 A | 4/1999 | Hwang | 327/540 |
| 6,150,804 A | 11/2000 | Taghizadeh-Kaschani | 323/285 |
| 6,232,755 B1 | 5/2001 | Zhang | 323/282 |
| 6,304,067 B1 | 10/2001 | Wrathall | 323/282 |
| 6,348,783 B2 | 2/2002 | Tateishi | 323/285 |
| 6,424,132 B1 | 7/2002 | Wrathall | 323/282 |
| 6,552,517 B1 | 4/2003 | Ribellino et al. | 323/282 |
| 6,556,081 B2 * | 4/2003 | Muza | 330/253 |
| 6,590,452 B1 * | 7/2003 | van Rhijn | 330/253 |

FOREIGN PATENT DOCUMENTS

EP  0 610 066 A1  1/1994

* cited by examiner

Primary Examiner—My-Trang Nu Ton
(74) Attorney, Agent, or Firm—Patent Law Group LLP; Carmen C. Cook

(57) ABSTRACT

An error amplifier circuit includes a differential amplifier with a cascode gain stage and an amplifier. The differential amplifier receives a first input signal and a second input signal and generates an output signal on an output terminal indicative of the difference between the first input signal and the second input signal. The cascode gain stage is coupled to receive the output signal of the differential amplifier and generates a second output signal. The cascode gain stage is biased by a bias current generated by a current mirror. The amplifier receives the second output signal from the cascode gain stage and generates a third output signal. The cascode gain stage is biased by a control signal for causing said current mirror to generate a bias current having substantially constant magnitude over variations in voltage differences of the first input signal and the second input signal.

19 Claims, 21 Drawing Sheets

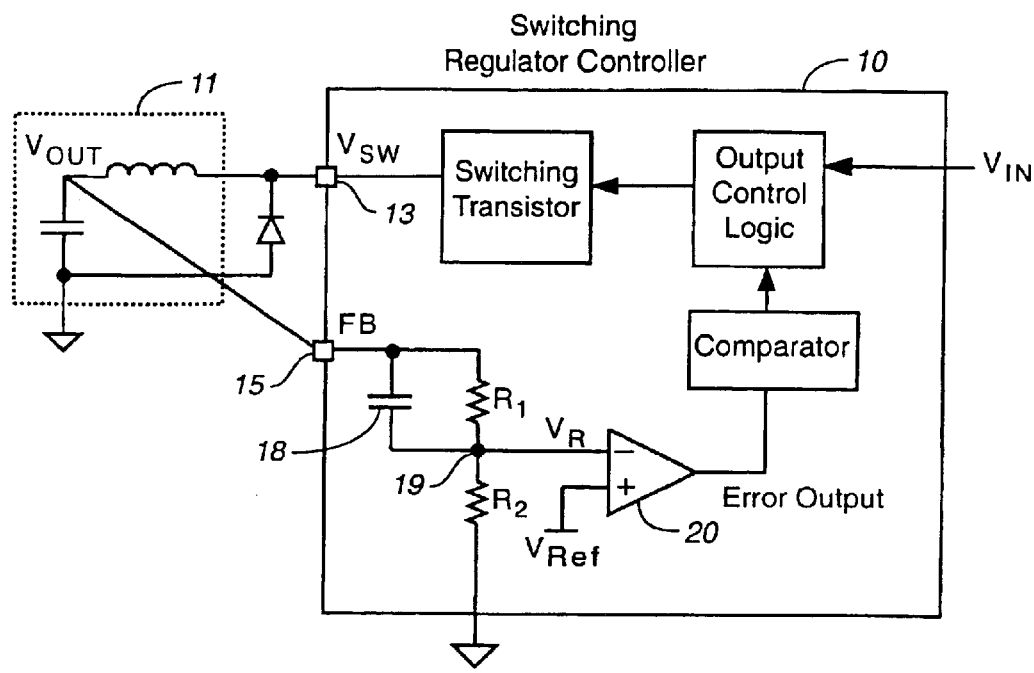
FIG. 1
*(PRIOR ART)*
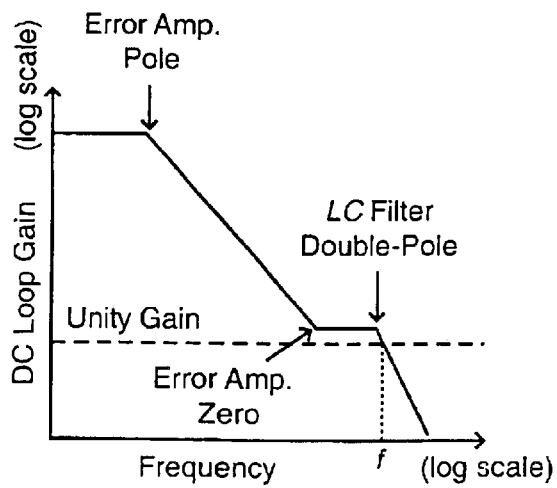 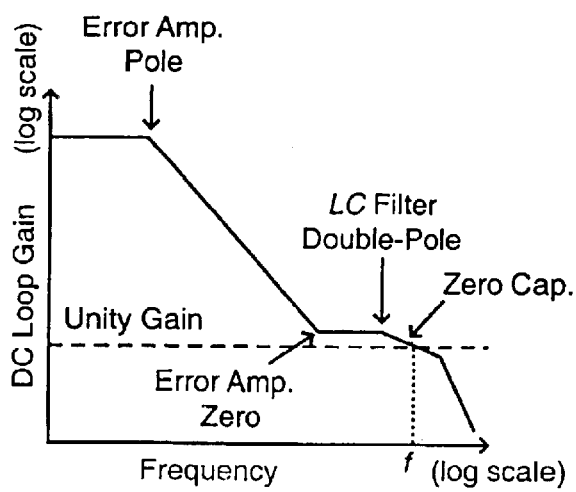
FIG. 2A    FIG. 2B

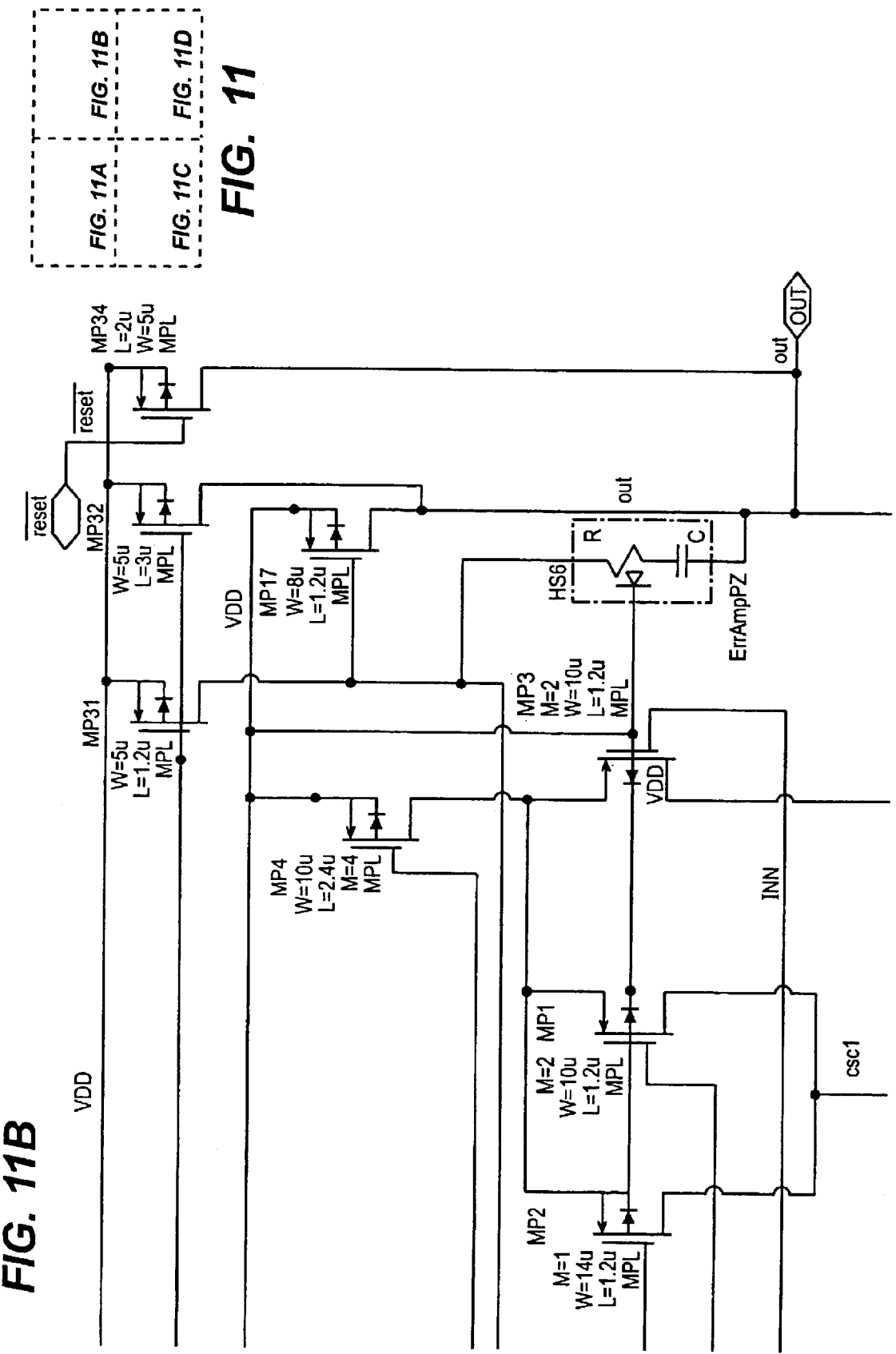

ERROR AMPLIFIER CIRCUIT

CROSS-REFERENCE TO RELATED APPLICATION

This application is related to U.S. Pat. No. 6,304,067, entitled "Adding A Laplace Transform Zero To A Linear Integrated Circuit For Frequency Stability," filed on Dec. 8, 2000, and issued Oct. 16, 2001, and U.S. Pat. No. 6,424,132, entitled "Adding A Laplace Transform Zero To A Linear Integrated Circuit For Frequency Stability," filed on Sep. 7, 2001, and issued Jul. 23, 2002, both of which by Robert S. Wrathall, the same inventor hereof, which patents are incorporated herein by reference in their entireties.

This application is also related to concurrently filed and commonly assigned U.S. patent application Ser. No. 10/210, 514, entitled "Amplifier Circuit for Adding a Laplace Transform Zero in A Linear Integrated Circuit," of the same inventor hereof.

FIELD OF THE INVENTION

The invention relates to an amplifier circuit for adding a Laplace transform zero to a linear integrated circuit, and more particularly to an amplifier circuit for adding a Laplace transform zero in a switching regulator feedback loop for providing frequency stability.

DESCRIPTION OF THE RELATED ART

Closed loop negative feedback systems are commonly employed in linear integrated circuits. For instance, switching regulators use a feedback loop to monitor the output voltage in order to provide regulation. To ensure stability in any closed loop system, the Nyquist criterion must be met. The Nyquist criterion states that a closed loop system is stable if the phase shift around the loop is less than 180 degrees at unity gain. Typically, a compensation circuit is added to a feedback loop to modulate the phase shift of the feedback loop to obtain stability.

The frequency response of a linear circuit can be characterized by the presence of "poles" and "zeros." A "pole" is a mathematical term which signifies the complex frequency at which gain reduction begins. On the other hand, a "zero" signifies the complex frequency at which gain increase starts. Poles and zeros on the left half plane of a complex frequency plane or s-plane are considered normal and can be compensated. However, poles and zeros on the right half plane of a complex frequency plane are usually problematic and difficult to manipulate and is not addressed in the present application. Generally, a pole contributes a −90° phase shift while a zero contributes a +90° phase shift. A pole cancels out the phase shift of a zero for zeros in the left half plane. In designing a closed loop system with compensation, the location of the poles and zeros are manipulated so as to avoid a greater than 180° phase shift at unity gain.

In a linear circuit, poles are created by placing a small capacitor on a node with a high dynamic impedance. If the capacitor is placed at a gain stage, the capacitance can be multiplied by the gain of the stage to increase its effectiveness. Each pole has a zero associated with it. That is, at some point, the dynamic resistance of the gain stage will limit the gain loss capable of being achieved by the capacitor. Thus, a zero can be created by placing a resistor in series with the gain reduction capacitor.

A conventional voltage mode switching regulator uses an inductor-capacitor (LC) network at the voltage output terminal for filtering the regulated output voltage to produce a relatively constant DC output voltage. FIG. 1 is a schematic diagram of a conventional switching regulator including a switching regulator controller 10 and an LC circuit 11. Switching regulator controller 10 generates a regulated output voltage $V_{SW}$ at an output terminal 13 which is coupled to LC circuit 11 for providing a filtered output voltage $V_{OUT}$. The output voltage $V_{OUT}$ is coupled back to controller 10 at a feedback (FB) terminal 15 for forming a feedback control loop. The LC circuit has associated with it two poles, one pole associated with each element. If the feedback control loop is not compensated, LC circuit 11 alone contributes an −180° phase shift to the system and loop instability results, causing the output voltage to oscillate. Because virtually every switching regulator uses an LC filter circuit to filter the regulated output voltage, compensation must be provided in the feedback control loop of a switching regulator to compensate for the effect of the two poles introduced by the LC circuit.

A conventional compensation technique in switching regulators involves adding a circuit in series with the feedback loop which produces a Laplace zero. The zero is added to the feedback control loop to cancel out one of the two poles of the LC filter circuit, thus insuring closed loop stability. U.S. Pat. No. 5,382,918 to Yamatake describes using a capacitance multiplying op-amp to provide a large effective capacitance and a resistor in series as the frequency compensation element of a switching regulator. U.S. Pat. No. 5,514,947 to Berg describes a phase lead compensation circuit for providing additional phase to the loop gain of a switching regulator near the unity gain frequency. The phase lead compensation circuit of Berg uses a transconductance amplifier driving a frequency-dependent load, implemented as a band-limited op amp, in the feedback control loop of the switching regulator. These approaches are problematic because they both require a "high quality" differential amplifier in operation which is significantly large and complex to realize. In practice, differential amplifiers are typically large devices and can be relatively slow. Furthermore, the differential amplifiers tend to sink large amounts of current proportional to speed. The compensation approaches described by Yamatake and Berg are undesirable because the compensation techniques require sacrificing speed for closed loop stability. In addition the op-amp used in the compensation circuit needs to be compensated for stability itself, making the circuit more complex to implement.

FIG. 1 illustrates another approach for providing compensation in a feedback control loop of a switching regulator. Referring to FIG. 1, the output voltage $V_{OUT}$ is coupled to the feedback terminal 15 and further to a voltage divider including resistors $R_1$ and $R_2$. The operation of the feedback control loop in controller 10 is well known in the art. The voltage divider steps down output voltage $V_{OUT}$ and the divided voltage $V_R$ is coupled to an error amplifier 20 which compares the divided voltage $V_R$ to a reference voltage $V_{Ref}$. Error amplifier 20 generates an error output signal indicative of the difference between voltage $V_R$ and reference voltage $V_{Ref}$. The feedback control loop of controller 10 operates to regulate the output voltage $V_{OUT}$ based on the error output of error amplifier 20 so that voltage $V_R$ equals voltage $V_{Ref}$.

FIG. 2A is a plot of the loop gain magnitude vs. frequency in log scale for the switching regulator of FIG. 1 without any compensation. The low frequency loop gain is first reduced by a pole associated with error amplifier 20. The gain loss is modified by a zero also associated with the error amplifier. Then, at high frequency, the effect of the double-pole in the LC filter circuit causes a large loss in the loop gain such that the phase shift at unity gain is equal to or greater than 180°.

The feedback control loop of the uncompensated switching regulator of FIG. 1 is unstable unless the gain is substantially reduced.

In the switching regulator of FIG. 1, a capacitor 18 (typically referred to as a "zero capacitor") is connected in parallel to resistor $R_1$ of the voltage divider. Capacitor 18 introduces a zero-pole pair in the feedback loop. The location (or frequency) of the zero-pole pair is determined by the resistance of the voltage divider and the capacitance of capacitor 18. For practical resistance and capacitance values, the zero and pole introduced by capacitor 18 are typically located close to each other so that the zero is canceled out quickly by the nearby associated pole. FIG. 2B is a plot of the loop gain magnitude vs. frequency in log scale in the switching regulator of FIG. 1 incorporating zero capacitor 18. Here, the operation of the zero capacitor ensures that the phase shift is less than 180° near unity gain. However, the compensation provided by zero capacitor 18 is limited and often does not provide sufficient phase margin at unity gain. For example, at high frequency, zero capacitor 18 shorts out resistor $R_1$, resulting in no or minimal gain loss in the feedback loop. Thus, the compensation provided by capacitor 18 is not effective at high frequency. Also, the voltage divider of resistors $R_1$ and $R_2$ typically provides only a gain loss of 3 dB. The 3 dB gain loss limits the ratio of the pole to zero angular frequency of capacitor 18, and thus, limits the compensation range capable of being achieved by the use of a single zero capacitor 18. The feedback loop of switching regulator of FIG. 1 is susceptible to instability when the switching regulator is subjected to fluctuations in load impedance because of this limited compensation range.

Thus, it is desirable to provide a compensation circuit in a feedback loop of a linear circuit which is capable of providing effective pole cancellation.

SUMMARY OF THE INVENTION

An error amplifier circuit includes a differential amplifier with a cascode gain stage and an amplifier. The differential amplifier receives a first input signal and a second input signal and generates an output signal on an output terminal indicative of the difference between the first input signal and the second input signal. The cascode gain stage is coupled to receive the output signal of the differential amplifier and generates a second output signal. The cascode gain stage is biased by a bias current generated by a current mirror. The amplifier receives the second output signal from the cascode gain stage and generates a third output signal. The cascode gain stage is biased by a control signal for causing said current mirror to generate a bias current having substantially constant magnitude over variations in voltage differences of the first input signal and the second input signal.

The present invention is better understood upon consideration of the detailed description below and the accompanying drawings.

BRIEF DESCRIPTION OF THE DRAWINGS

FIG. 1 is a schematic diagram of a conventional switching regulator including a zero capacitor for compensation.

FIG. 2A is a loop gain vs. frequency plot for a conventional feedback system in a switching regulator without zero compensation.

FIG. 2B is a loop gain vs. frequency plot for a feedback system in a switching regulator including a zero capacitor for compensation.

DETAILED DESCRIPTION OF THE PREFERRED EMBODIMENTS

In accordance with the present invention, a zero generation circuit for adding a Laplace transform zero in a linear or analog circuit includes a blocking capacitor and an open loop amplifier coupled to a zero capacitor for multiplying the capacitance of the zero capacitor. The zero generation circuit provides a wide band and effective zero for pole cancellation in a linear circuit for obtaining frequency stability. The zero generation circuit of the present invention has the advantages of consuming a small circuit area and being power efficient, drawing only a small bias current. Furthermore, the zero generation circuit can operate at high frequency to provide compensation for a large frequency range. The zero generation circuit of the present invention can be applied in switching voltage regulators and other closed loop feedback systems with multiple poles for introducing effective "zero" compensation and improving frequency stability.

In the present description, a "zero" and a "pole" have meanings well understood by one skilled in the art. Specifically, a "zero" refers to the complex frequency at which the frequency response of a linear circuit has a zero amplitude, and a "pole" refers to the complex frequency at which the frequency response of a linear circuit has an infinite amplitude. In a feedback system, a pole signifies the frequency at which gain reduction begins while a zero signifies the frequency at which gain increase starts.

Figure 3:
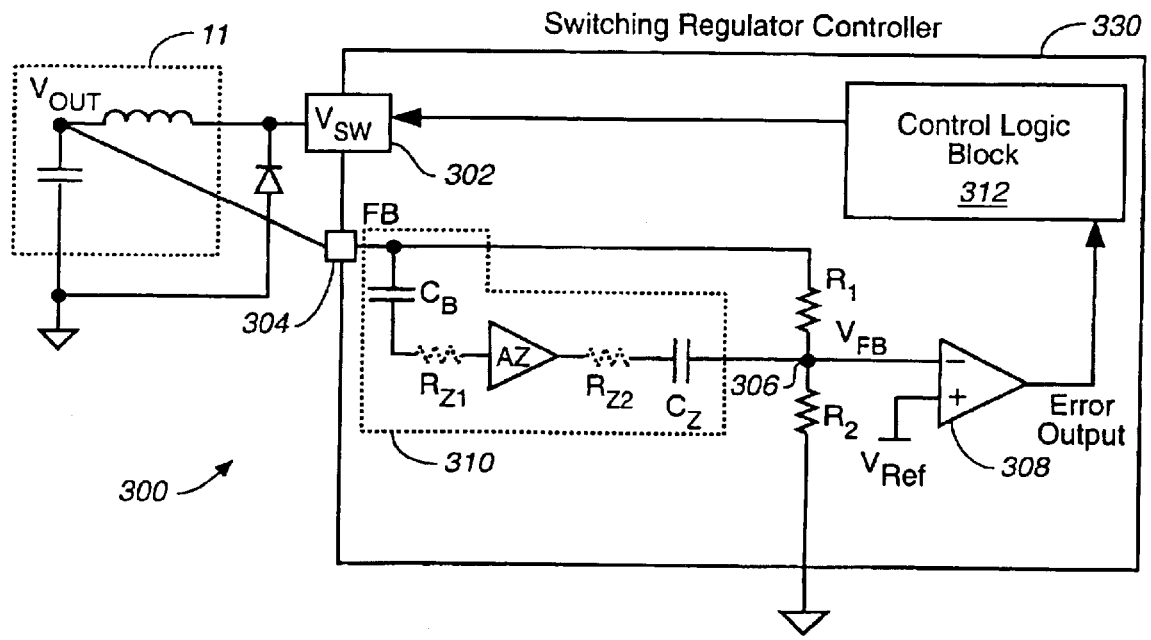
FIG. 3 is a schematic diagram of a switching regulator including a switching regulator controller incorporating a zero generation circuit according to one embodiment of the present invention.

FIG. 3 is a schematic diagram of a switching regulator including a switching regulator controller incorporating a zero generation circuit according to one embodiment of the present invention. The circuitry of switching regulator controller 330 is conventional except for the zero generation circuit 310. Switching regulator controller 330 generates a regulated output voltage $V_{SW}$ on an output terminal 302. The regulated output voltage $V_{SW}$ is coupled to an LC filter circuit 11 to generate an output voltage $V_{OUT}$ having substantially constant magnitude. Switching regulator 300, constructed using controller 330 and LC circuit 11, forms a closed loop feedback system for regulating output voltage $V_{SW}$ and consequently, the output voltage $V_{OUT}$. The output voltage $V_{OUT}$ from LC filter circuit 11 is fed back to controller 330 on a feedback terminal 304. Typically, the output voltage $V_{OUT}$ is coupled to a voltage divider including resistors $R_1$ and $R_2$ and generating a feedback voltage $V_{FB}$ at a divider output node 306. The voltage divider functions to step down the output voltage $V_{OUT}$ to a reference voltage level $V_{Ref}$ at output node 306. The stepped down feedback voltage $V_{FB}$ is coupled to the control circuitry of controller 330. In FIG. 3, the control circuitry of controller 330 is illustrated as including an error amplifier 308 and a control logic block 312. The feedback voltage $V_{FB}$ is coupled to the inverting terminal of error amplifier 308. A reference voltage $V_{Ref}$ is coupled to the non-inverting input terminal of error amplifier 308. The error output generated by error amplifier 308 is coupled to control logic block 312 for regulating the regulated output voltage $V_{SW}$ on node 302. Control logic block 312 is conventional and numerous implementations are possible. Typically, control logic block 312 includes a logic control circuit and one or more switching transistors. If controller 330 is operating in a PWM mode, control logic block 312 may further include a PWM comparator to which the error output is coupled. The schematic diagram of FIG. 3 is simplified to better illustrate the principles of the present invention. It is understood by one skilled in the art that, in actual implementation, switching regulator controller 330 may include additional terminals and circuitry for the specific application.

In the feedback loop of switching regulator 300, error amplifier 308 has associated with it a pole and a zero. The pole and zero within error amplifier 308 are typically easy to generate because error amplifier 308 includes high impedance nodes. However, it is difficult to generate more than one pole or zero within error amplifier 308. On the other hand, LC filter circuit 11 introduces two poles to the feedback loop of switching regulator 300 which need to be compensated.

In the present embodiment, a zero generation circuit 310 is incorporated in controller 330 to introduce a zero to the feedback loop of switching regulator 300, in addition to the zero generated by the error amplifier. Zero generation circuit 310 functions to ensure that the feedback system of switching regulator 300 meets the Nyquist criterion for frequency stability.

According to one embodiment of the present embodiment, zero generation circuit 310 includes a blocking capacitor $C_B$, an amplifier AZ, and a zero capacitor $C_Z$, connected in series between feedback terminal 304 and feedback voltage $V_{FB}$ (node 306). In FIG. 3, circuit 310 is illustrated with a resistor $R_{Z1}$ between capacitor $C_B$ and amplifier AZ and with a resistor $R_{Z2}$ between amplifier AZ and capacitor $C_Z$ drawn in dotted line. Resistors $R_{Z1}$ and $R_{Z2}$ are illustrative only and are used to represent the equivalent input impedance and the equivalent output impedance, respectively, of amplifier AZ. Although resistors $R_{Z1}$ and $R_{Z2}$ are not meant to be actual elements or components in an actual implementation of circuit 310, circuit 310 may include resistors as needed for the implementation of amplifier AZ or for other purposes. As will be explained in more detail below, one embodiment of amplifier AZ includes an input resistor $R_{ZI}$ which, when combined with the gain of the first gain stage in amplifier AZ, creates the input impedance $R_{Z1}$ shown in FIG. 3.

In operation, capacitor $C_B$ receives output voltage $V_{OUT}$ on feedback terminal 304 and functions to block out the DC component of output voltage $V_{OUT}$. Amplifier AZ amplifies the AC component of output voltage $V_{OUT}$ provided by capacitor $C_B$ before coupling the AC signal to zero capacitor $C_Z$. The amplification function performed by amplifier AZ has the effect of amplifying the capacitance of capacitor $C_Z$ such that capacitor $C_Z$ can be implemented as a smaller capacitor while capable of introducing an effective zero in the feedback system. Furthermore, the AC signal amplification provided by amplifier AZ is also capable of introducing a zero having a wide range of applicability so that the zero is effective over a wide band of frequency. The zero signal generated by capacitor $C_Z$ is summed with feedback voltage $V_{FB}$ at node 306 before the feedback voltage $V_{FB}$ is coupled to the control circuitry of controller 330. In FIG. 3, the summed feedback voltage is coupled to error amplifier 308.

The transfer function from the feedback voltage $V_{FB}$ to the error output (denoted voltage $V_{EOUT}$), in the limiting conditions of $R_1 \gg R_2$, $A_Z \gg 1$ and $r \sim 1$, is given as follows:

$$\frac{V_{FB}}{V_{EOUT}} \approx \frac{1}{r} \frac{(A_Z * C_Z * R_1 * s + 1)}{((R_1/r) * C_Z * s + 1)}, \quad (1)$$

where $A_Z$ is the gain of amplifier AZ, s is the complex frequency of the Laplace transform and r is given as:

$$r = \frac{R_1}{R_2} + 1. \quad (2)$$

Equation (1) above yields a pole and a zero angular frequency as follows:

$$\omega_Z = 1/A_Z * R_1 * C_Z, \text{ and} \quad (3)$$

$$\omega_p = 1/(R_1/r) * C_Z. \quad (4)$$

As can be seen from equation (3) above, resistor $R_1$ of the voltage divider of controller 330 provides the resistive load to capacitor $C_Z$ and amplifier AZ for adding a zero in the feedback system. On the other hand, while in equation (4), both resistors $R_1$ and $R_2$ are used to provide a resistive load for introducing the pole of zero generation circuit 310, resistor $R_2$ is not critical for the placement of the pole and can be omitted in other embodiments of the present invention. When resistor $R_2$ is omitted (that is, resistance of resistor $R_2$ is infinite), the factor r has a value of 1 (equation 2) and the angular frequency of the pole, ωp, depends only on the resistive load of $R_1$.

The ratio of pole angular frequency (equation 4 above) to the zero angular frequency (equation 3 above) is given as follows:

$$\frac{\omega_P}{\omega_Z} = A_2 * r. \quad (5)$$

By adjusting the gain AZ of amplifier AZ, a very effective and wide band zero for pole cancellation can be generated in the feedback system of switching regulator 300. Referring to equation (5) above, in a conventional feedback system without any "zero" amplification, i.e., when the gain AZ is equal to 1, the ratio of the pole to zero angular frequency is equal to r and is approximately 2. On the other hand, in a feedback system employing zero generation circuit 310, even when amplifier AZ only has a modest gain of 10, a pole-to-zero frequency ratio of 20 can be obtained. Thus, the zero generation circuit of the present invention is effective in generating a zero with a much broader effective range than that can be obtained with the conventional compensation techniques.

Figure 4:
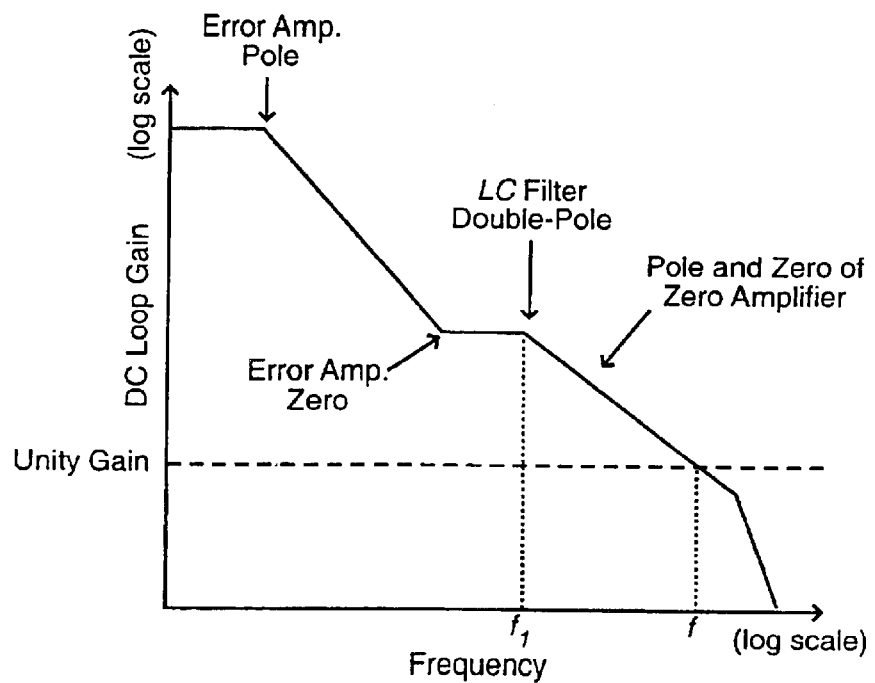
FIG. 4 is a loop gain vs. frequency plot for the feedback system of the switching regulator in FIG. 3.

FIG. 4 is a loop gain vs. frequency plot (in log scale) for the feedback system of the switching regulator of FIG. 3. FIG. 4 illustrates the effect on the loop gain vs. frequency behavior of switching regulator 300 after zero generation circuit 310 introduces a zero in the feedback system of the switching regulator. Referring to FIG. 4, the pole and zero of error amplifier 308 first diminishes the low frequency loop gain of switching regulator 300. At frequency f1, the double-pole of LC filter circuit 11 takes effect. At high frequency, the zero introduced by zero generation circuit 310 (also called the "amplified zero") takes effect. If the onset of the effect of the amplified zero is perfectly matched to the position of the double-pole of LC filter circuit 11, then the amplified zero will cancel out the effect of one of the double poles. As shown in FIG. 4, the zero-pole pair of the amplified zero is spread much further apart in frequency range than that of the conventional single zero capacitor compensation circuit as shown in FIG. 2B. The wide-range spacing of the zero-pole pair of circuit 310 allows for a wider design latitude either for optimizing compensation or for increasing loop gain. Zero generation circuit 310 of the present invention amplifies the effect of the zero of zero capacitor $C_Z$. The action of amplifier AZ introduces a zero having a wide range of effectiveness. Therefore, the placement of the zero in the feedback system is not as critical as in conventional systems. Consequently, zero generation circuit 310 has more tolerance for variations in capacitance values of capacitor $C_Z$. Zero generation circuit 310 improves the overall performance of switching regulator 300.

Figure 5:
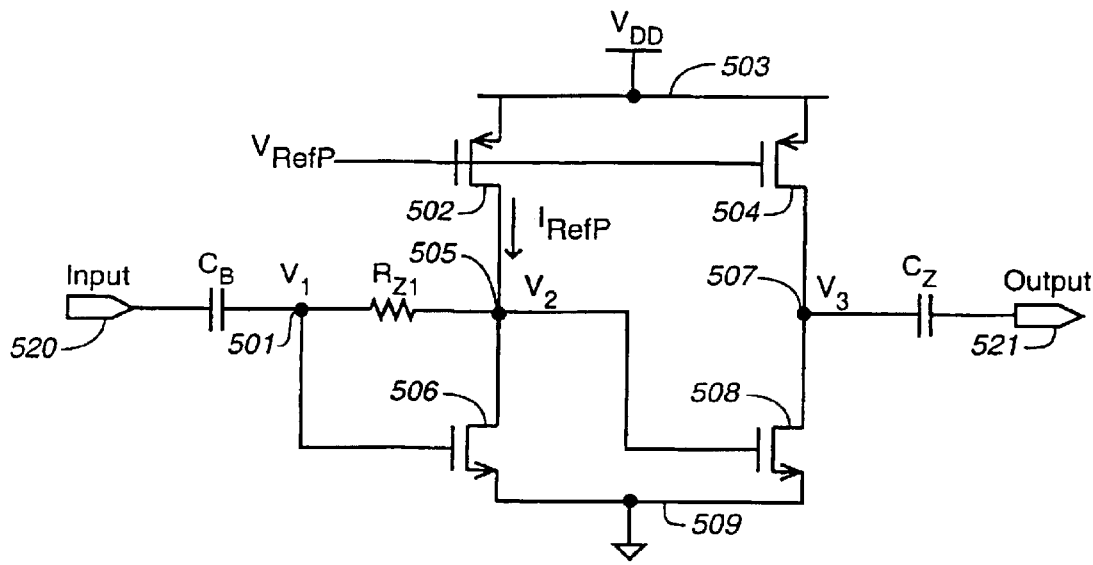
FIG. 5 is a circuit diagram of a zero generation circuit implemented using CMOS devices according to one embodiment of the present invention.

Amplifier AZ of zero generation circuit 310 is an open loop amplifier and can be implemented as any conventional gain stages known in the art. FIG. 5 is a circuit diagram of a zero generation circuit implemented using CMOS devices according to one embodiment of the present invention. Capacitors $C_B$ and $C_Z$ can be implemented as any conventional capacitor structures and in the present embodiment, capacitors $C_B$ and $C_Z$ are MOS capacitors. Capacitor $C_Z$ can have a capacitance value between 1 to 5 picofarads while capacitor $C_B$ has a capacitance value about one-fifth of capacitor $C_Z$. As described above, capacitor $C_B$ functions to block out the DC component of the output voltage $V_{OUT}$ presented at the circuit input node 520. Thus, the voltage $V_1$ at the other side of capacitor $C_B$ (node 501) is the AC component of the output voltage $V_{OUT}$. In the present embodiment, amplifier AZ is implemented as a two-stage gain block with self-biasing capability. The first gain stage includes a resistor $R_{ZI}$ coupled between nodes 501 and 505 and an NMOS transistor 506 biased by a current mirror. Resistor $R_{ZI}$ and the gain of the first gain stage create the effective input impedance $R_{Z1}$ of amplifier AZ. Resistor $R_{ZI}$ can be implemented as a diffused resistor or a polysilicon resistor. In the present embodiment, resistor $R_{ZI}$ is a diffused resistor having a resistance value of approximately 400 kΩ. The current mirror of the first gain stage is implemented by PMOS transistor 502. The gate terminal of transistor 502 is coupled to a reference voltage $V_{RefP}$ for generating a reference current $I_{RefP}$ at the drain terminal (node 505) of transistor 502. The source terminal of transistor 502 is coupled to a power supply terminal 503 providing a supply voltage VDD. NMOS transistor 506 has its gate terminal connected to node 501 and its drain and source terminals connected between node 505 and a ground node 509. Thus, transistor 506 amplifies the voltage $V_1$ and generates an output voltage $V_2$ at node 505. The second gain stage of amplifier AZ includes an NMOS transistor 508 biased by a current mirror including a PMOS transistor 504. PMOS transistor 504 is connected in an analogous manner as PMOS transistor 502 and generates a reference current $I_{RefP}$ at the drain terminal (node 507) of transistor 504. NMOS transistor 508 has its gate terminal coupled to node 505 and amplifies the voltage $V_2$ to provide an output voltage $V_3$ at output node 507. The amplified voltage $V_3$ is coupled to zero capacitor $C_Z$. The action of amplifier voltage $V_3$ and zero capacitor $C_Z$ introduces a zero at a circuit output node 521 having more effectiveness than a zero introduced by conventional compensation circuits. In the present embodiment, PMOS transistors 502 and 504 are of the same sizes while NMOS transistors 506 and 508 are also of the same sizes. In one embodiment, PMOS transistors 502 and 504 each has a width of 20 μm and a length of 3 μm. On the other hand, NMOS transistors 506 and 508 each has a width of 6 μm and a length of 2 μm.

The zero generation circuit of the present invention achieves advantages not obtainable in conventional compensation circuits. First, the zero generation circuit utilizes common circuit components and is simple to implement. Contrary to conventional compensation techniques where a closed loop amplifier is used to set the proper gain and phase for the zero function, the zero generation circuit of the present invention simply modulates the location or placement of the zero generated by a zero capacitor. When applied in a switching regulator controller, the zero generation circuit of the present invention is connected to the voltage divider already present in the controller and requires little modification of the overall controller design. The circuit of the present invention avoids adding complex and space consuming compensation circuits to the switching regulator controller as is done the prior art. Second, the zero generation circuit is small in size and thus, is cost effective to incorporate in any linear circuits. Because the capacitance of zero capacitor $C_Z$ is amplified by the action of amplifier AZ, a small capacitor $C_Z$ can be used, resulting in a smaller circuit area in implementation. Through the use of CMOS devices and an open loop amplifier AZ, the zero generation circuit can be operated at very high frequency. Furthermore, the zero generated in the zero generation circuit of the present invention has effectiveness over a wide range of frequencies and thus the circuit can tolerate variations in manufacturing processes and fluctuations in the load impedance.

Figure 6:
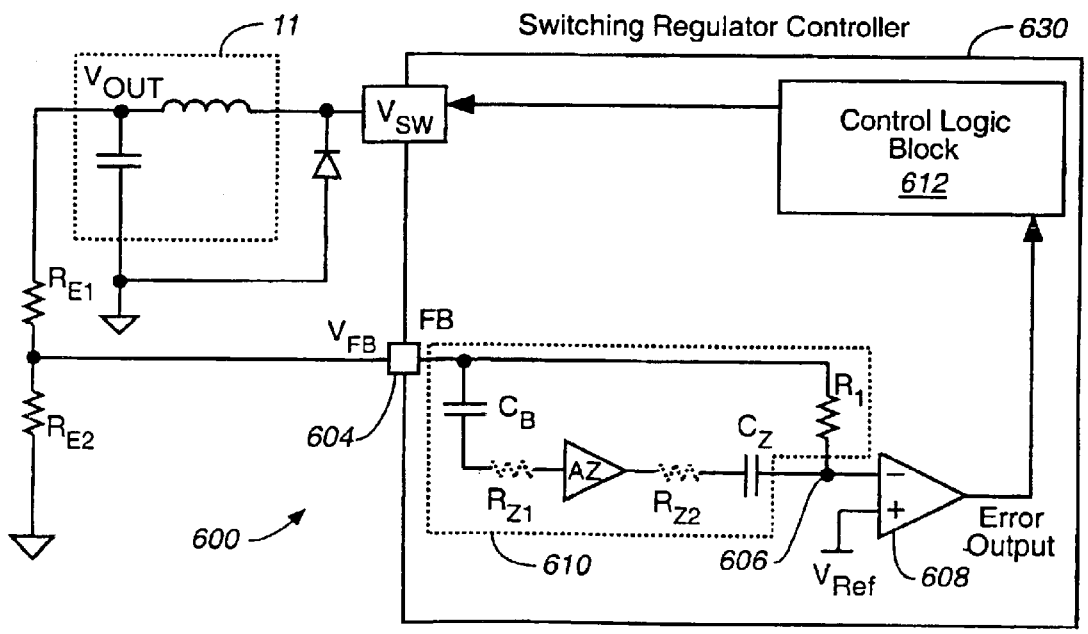
FIG. 6 is a schematic diagram of a switching regulator controller incorporating a zero generation circuit according to another embodiment of the present invention.

In the above embodiment, the zero generation circuit is incorporated in a controller for a fixed switching regulator having an internal voltage divider. As mentioned above, resistor $R_1$ of the voltage divider in controller 330 is used to provide a resistive load to zero generation circuit 310 for introducing an effective zero at node 306. In another embodiment of the present invention, the zero generation circuit of the present invention can also be incorporated in a switching regulator controller for an adjustable switching regulator as illustrated in FIG. 6. Referring to FIG. 6, in an adjustable switching regulator 600, an external voltage divider, including resistors RE1 and RE2, are used for stepping down the output voltage $V_{OUT}$. The output of the voltage divider of resistors RE1 and RE2 generates the feedback voltage $V_{FB}$ to be coupled to switching regulator controller 630 on a feedback terminal 604 to form the feedback loop for regulating the output voltage $V_{SW}$. In conventional switching regulator controllers, the feedback voltage $V_{FB}$ is coupled directly to error amplifier 608. However, in accordance with the present embodiment, a zero generation circuit 610 is incorporated into switching regulator controller 630 to generate an effective zero for compensating the double-pole of the LC filter circuit in the feedback system of adjustable switching regulator 600. In switching regulator controller 630, zero generation circuit 610 is coupled between feedback terminal 604 and a node 606 which is the inverting input terminal of error amplifier 608. The structure and operation of zero generation circuit 610 is the same as circuit 310 described above. Basically, capacitor $C_B$ blocks out the DC components of the feedback voltage $V_{FB}$ and amplifier AZ amplifies the AC components of the feedback voltage and couples the amplified voltage signal to zero capacitor $C_Z$. In the case of the adjustable switching regulator, zero generation circuit 610 further includes a resistor $R_1$ connected in parallel to the capacitors and amplifier circuit elements of the zero generation circuit (i.e. between node 604 and node 606). Resistor $R_1$ is used to provide a resistive load to zero generation circuit 610 for introducing an effective zero at node 606. In the present embodiment, the resistance of resistor $R_1$ is between 100 k to 200 k ohms. In one embodiment, resistor $R_1$ of circuit 610 is the same resistor $R_1$ in the voltage divider of switching regulator controller 330 of fixed switching regulator 300. Thus, controller 630 for an adjustable switching regulator can be built using the same circuit design as controller 330 for a fixed switching regulator except that, for controller 630, resistor $R_2$ of the voltage divider of controller 330 is disconnected from node 606. Zero generation circuit 610 generates a wide band zero for effective pole-cancellation in the feedback system of switching regulator 600 and ensures that the switching regulator can achieve frequency stability in operation.

Figure 8:
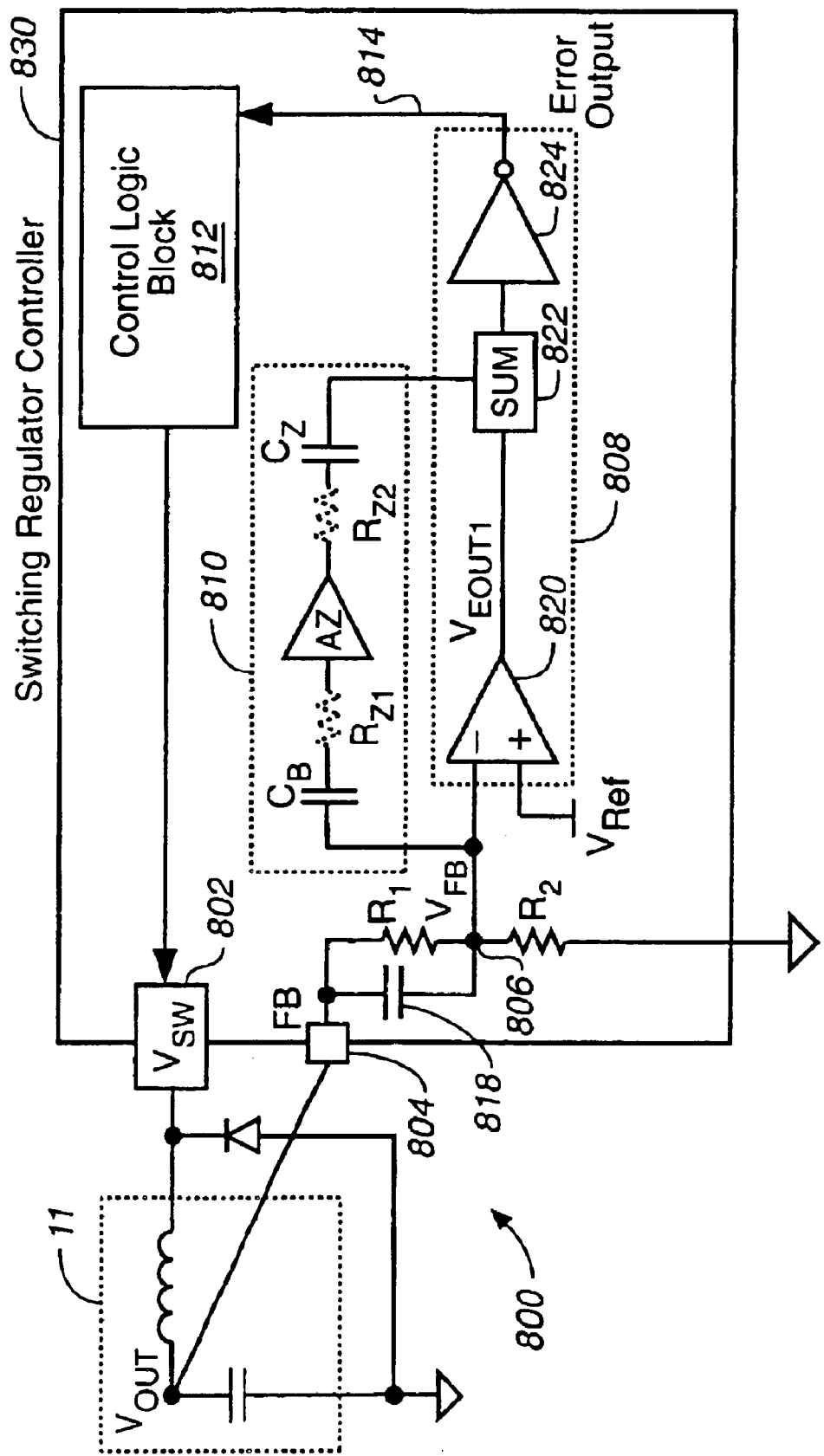
FIG. 8 is a schematic diagram of a switching regulator controller incorporating a zero generation circuit according to a second alternate embodiment of the present invention.
Figure 9:
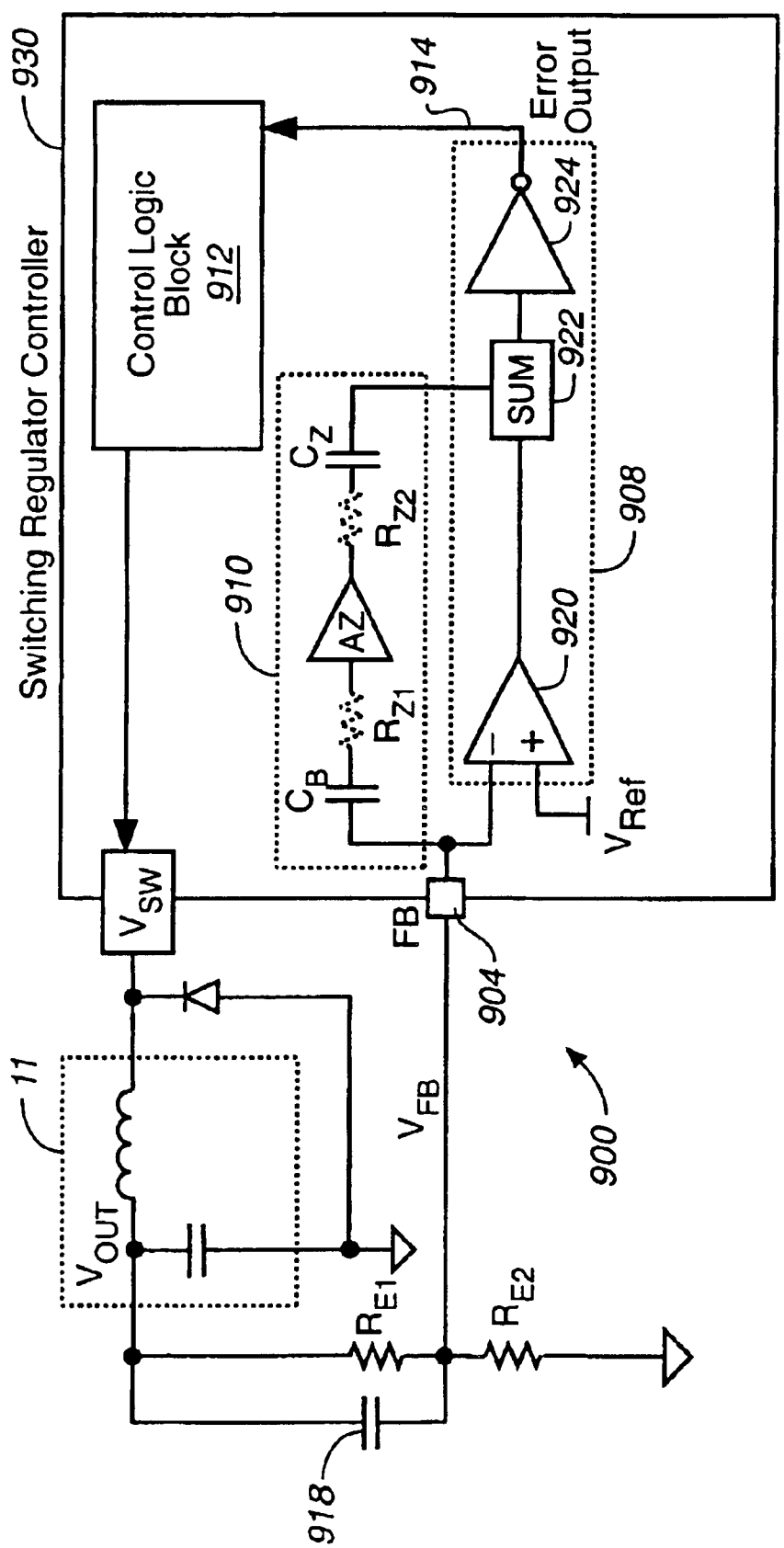
FIG. 9 is a schematic diagram of a switching regulator controller incorporating a zero generation circuit according to another embodiment of the present invention.

In the above-described embodiments, the zero generation circuit of the present invention generates a zero which is summed with the feedback voltage VF3 at the input terminal of the error amplifier of the switching regulator controller. According to another aspect of the present invention, the summing node where the zero is introduced can be placed at other points in the feedback loop for providing effective zero compensation and improving frequency stability of the linear integrated circuit. Thus, other configurations for incorporating the zero generation circuit of the present invention in a switching regulator or other linear circuits are possible, as illustrated in FIGS. 7–9.

Figure 7A:
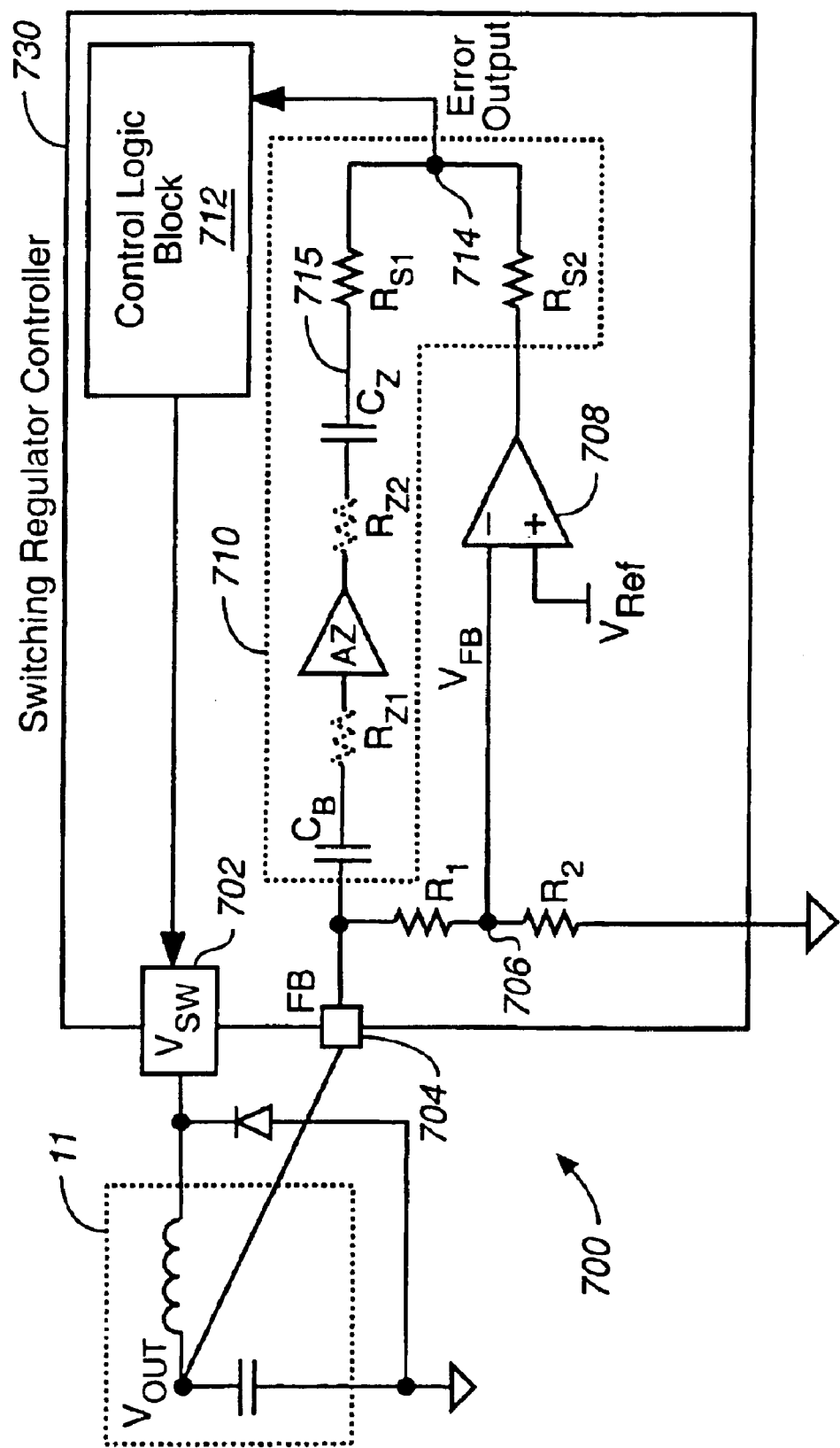
FIG. 7A is a schematic diagram of a switching regulator controller incorporating a zero generation circuit according to an alternate embodiment of the present invention.

FIG. 7A is a schematic diagram of a switching regulator controller incorporating a zero generation circuit according to an alternate embodiment of the present invention. In switching regulator 700 of FIG. 7A, the summing node where the zero is introduced is placed at the output node of error amplifier 708. Thus, zero generation circuit 710 generates a zero which is summed with the output signal at the output terminal of error amplifier 708 to generate the error output signal at node 714. The configuration shown in FIG. 7A has the advantage of providing a zero in the feedback loop while bypassing the error amplifier circuit. In some applications, it may not be desirable to introduce the zero at the input terminal of the error amplifier as the gain of the amplifier AZ in the zero generation circuit may be so large that the input signal to the error amplifier becomes saturated. In those cases, the configuration shown in FIG. 7A is preferable as the error amplifier is bypassed and the zero is introduced at the output terminal of the error amplifier instead.

Referring to FIG. 7A, zero generation circuit 710 is incorporated in switching regulator controller 730 for a fixed switching regulator 700. Thus, controller 730 includes an internal voltage divider implemented as resistors $R_1$ and $R_2$ in FIG. 7A. The output voltage of the voltage divider (node 706) is the feedback voltage $V_{FB}$ which is coupled to the inverting input terminal of error amplifier 708 to form the feedback loop for regulating the output voltage $V_{SW}$ at node 702. The regulated output voltage $V_{SW}$ is coupled to an LC filter 11 to generate an output voltage $V_{OUT}$ having substantially constant magnitude. The output voltage $V_{OUT}$ is fed back to controller 730 on a feedback terminal 704 to form the closed loop feedback system.

In the present embodiment, zero generation circuit 710 is coupled between feedback terminal 704 and a node 715. Node 715 is coupled to a summing circuit including resistors $R_{S1}$ and $RS_2$ providing a summed signal at node 714 (also referred to as the summing node). The zero generated by zero generation circuit 710 is summed with the output signal from error amplifier 708 through resistors $R_1$ and $R_{S2}$ to affect the error output signal. In this manner, zero generation circuit 710 generates an effective zero for compensating the double-pole of the LC filter circuit in the feedback system of fixed switching regulator 700.

Zero generation circuit 710 can be implemented in the same manner as circuits 310 and 610 described previously. A capacitor $C_B$, coupled to the feedback terminal 704, is used to block out the DC components of the output voltage $V_{OUT}$ fed back to controller 730 at feedback terminal 704. An amplifier AZ, coupled to capacitor $C_B$, amplifies the AC components of the feedback voltage and couples the amplified voltage signal to a zero capacitor $C_Z$. Amplifier AZ can be implemented as shown in FIG. 5. The zero generated by zero capacitor $C_Z$ is converted to a voltage value by resistor $R_{S1}$. On the other hand, the output signal of error amplifier 708 is converted to a voltage value by resistor $R_{S2}$. The zero signal and the error amplifier output signal are summed at summing node 714 to generate the error output signal. The error output signal is coupled to control logic block 712 for regulating the regulated output voltage $V_{SW}$ on node 702.

In zero generation circuit 710, the resistance values of resistors $R_{S1}$ and $R_{S2}$ can vary from a very small value, such as near zero, to a very large value. Typically, a resistance value of 200 k ohms for resistor $R_{S1}$ and a resistance value of 200 k ohms for resistor $R_{S2}$ can be used. The ratio of the resistance of resistors $R_{S1}$ to $R_{S2}$ can also vary from near zero to a very large value. Typically, a $R_{S1}/R_{S2}$ resistance ratio of 1 can be used.

In the embodiment shown in FIG. 7A, the zero generation circuit generates a zero signal having wide range of applicability and is effective for compensating the double-pole of the LC filter circuit in the feedback system. Furthermore, the zero generation circuit retains all of the benefits of the zero generation circuits in the previous embodiments, while providing additional benefits not realized in the previous embodiments. Because the zero signal of the zero generation circuit does not propagate through the error amplifier of the switching regulator controller, significant performance enhancements can be achieved such as preventing saturation of the error amplifier input.

Figure 7B:
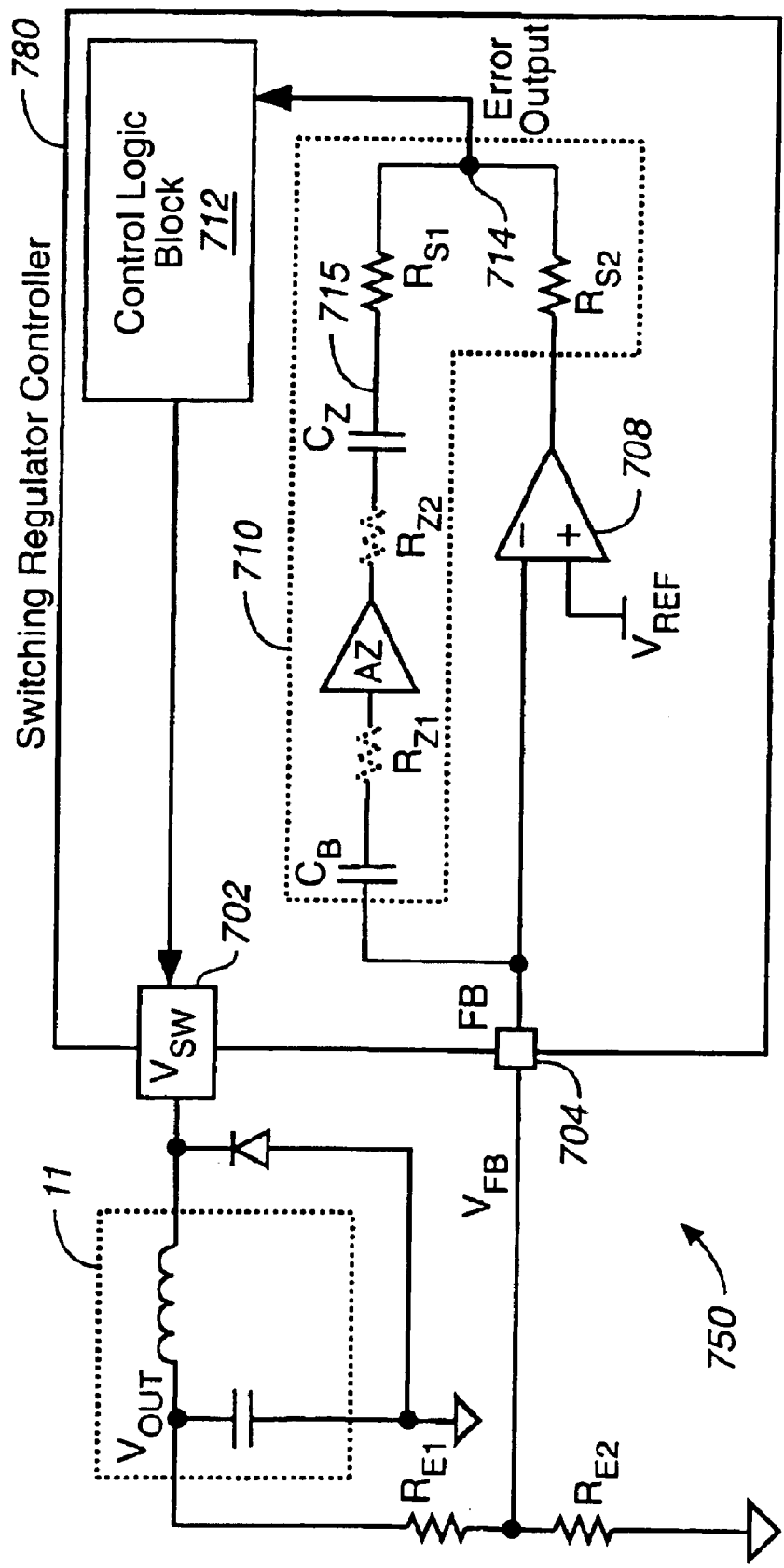
FIG. 7B is a schematic diagram of a switching regulator controller incorporating a zero generation circuit according to another embodiment of the present invention.

FIG. 7B illustrates the application of the configuration of FIG. 7A to an adjustable switching regulator utilizing an external voltage divider according to another embodiment of the present invention. Like elements in FIGS. 7A and 7B are given the same reference numerals to simplify the discussion. In adjustable switching regulator 750, zero generation circuit 710 is coupled between the feedback terminal 704 receiving the feedback voltage $V_{FB}$ and a node 715 coupled to a summing circuit. Feedback voltage $V_{FB}$ is the divided voltage of output voltage $V_{OUT}$ and is generated by an external voltage divider circuit including resistors RE1 and RE2. As described above, the summing circuit includes resistors $R_{S1}$ and $R_{S2}$ and is coupled to sum the zero signal generated at node 715 and the error output voltage generated by error amplifier 708. The operation of zero generation circuit 710 in switching regulator controller 780 is the same as in switching regulator controller 730 of FIG. 7A. The placement of the voltage divider external to switching regulator controller 780 has no impact on the operation of the zero generation circuit. Zero generation circuit 710 introduces a zero at the summing node which is summed with the error voltage from error amplifier 708. The zero introduced in the feedback loop of switching regulator 750 has a wide range of effectiveness.

FIG. 8 is a schematic diagram of a switching regulator controller incorporating a zero generation circuit according to a second alternate embodiment of the present invention. In switching regulator 800 of FIG. 8, error amplifier 808 is split into two gain stages (denoted by amplifiers 820 and 824) and the summing node where the zero is introduced is placed between the first gain stage and the second gain stage of the error amplifier. Thus, zero generation circuit 810 generates a zero which is summed with the output signal of the first gain stage and the resultant signal is further amplified by the second gain stage to generate the error output signal. The configuration shown in FIG. 8 provides numerous advantages, as will be described in more detail below.

Referring to FIG. 8, zero generation circuit 810 is incorporated in switching regulator controller 830 for a fixed switching regulator 800. Thus, resistors $R_1$ and $R_2$ represent the internal voltage divider for stepping down the output voltage $V_{OUT}$ received at feedback node 804. The output voltage of the voltage divider (node 806) is the feedback voltage $V_{FB}$ which is coupled to an inverting input terminal of error amplifier 808 to form the feedback loop for regulating the output voltage $V_{SW}$ at node 802. The regulated output voltage $V_{SW}$ is coupled to an LC filter 11 to generate an output voltage $V_{OUT}$ having substantially constant magnitude. The output voltage $V_{OUT}$ is fed back to controller 830 on feedback terminal 804 to form the closed loop feedback system.

As mentioned above, error amplifier 808 includes two gain stages, represented by amplifier 820 and inverting amplifier 824. One having ordinary skill in the relevant art would appreciate that the error amplifier in the switching regulator controller in this or other embodiments described herein can be either inverting or non-inverting depending on circuit design to provide the correct phase shift in the output signal. The exact polarity of the error amplifier is not critical to the principle of the present invention. Error amplifier 808 further includes a summing circuit 822 coupled between the output terminal of the first gate stage (amplifier 820) and the input terminal of the second gain stage (amplifier 824).

In the configuration shown in FIG. 8, zero generation circuit 810 is coupled between voltage divider output node 806 and a summing node in summing circuit 822 of error amplifier 808. Zero generation circuit 810 can be implemented in the same manner as described in the previous embodiments. Thus, zero generation circuit 810 includes a capacitor $C_B$, an amplifier AZ, and a zero capacitor $C_Z$, connected in series between node 806 and summing circuit 822. Zero generation circuit 810 operates in the same manner as described in the previous embodiments to generate a zero for the feedback loop of switching regulator 800.

In switching regulator controller 830, amplifier 820 of error amplifier 808 operates on the feedback voltage $V_{FB}$ received directly from the voltage divider circuit. At amplifier 820, feedback voltage $V_{FB}$ is compared with a reference voltage $V_{Ref}$ to generate an error signal denoted as $V_{EOUT1}$ at the output terminal of amplifier 820. The error signal $V_{EOUT1}$ is then summed with the zero generated by zero generation circuit 810 by summing circuit 822. The summed signal is provided to the second gain stage (amplifier 824) which amplifies the summed signal. The output signal of amplifier 824 is the error output signal (node 814) of error amplifier 808. The error output signal is coupled to control logic block 812 for regulating the regulated output voltage $V_{SW}$ on node 802. In this manner, zero generation circuit 810 generates an effective zero for compensating the double-pole of the LC filter circuit in the feedback system of fixed switching regulator 800.

In the present embodiment, the zero generated by the zero generation circuit 810 bypasses the first gain stage of error amplifier 808 and is coupled to summing circuit 822 in the error amplifier. The zero signal, summed with the error voltage $V_{EOUT1}$, is further amplified by the second gain stage to generate the error output signal of error amplifier 808. The configuration of zero generation circuit 810 in FIG. 8 provides several advantages.

First, the configuration of FIG. 8 allows a zero with very high gain to be generated while avoiding the problem of saturating the front end of the error amplifier. As mentioned above, in the embodiments where the zero is introduced at the input terminal of the error amplifier, the gain of the zero signal has to be carefully controlled so as not to saturate the input signal to the error amplifier. On the other hand, the configuration of FIG. 8 is not subject to such limitation since the zero is not introduced at the input terminal of the error amplifier.

Second, by summing the zero and the error voltage $V_{EOUT1}$ prior to a second gain stage, the configuration in FIG. 8 is capable of providing a zero with very large gain as the summed signal is further amplified by the subsequent second gain stage. In the configuration of FIG. 7A, the zero is summed with the error output signal at node 714. Because there is no further amplification of the zero subsequent to the summing operation, the zero may not have a large enough gain. On the other hand, the configuration of FIG. 8 provides a zero with a very large gain since the zero is subjected to another gain stage after the summing operation. As will be explained in more detail below, amplifier 820 is designed to give the output voltage $V_{EOUT1}$ an appropriate gain so that the summed signal of summing circuit 822 does not saturate the input of amplifier 824.

Third, in FIG. 8, the zero generation circuit relies on the second gain stage of the error amplifier to provide additional gain. Therefore, the zero generation circuit does not rely on resistor $R_1$ to provide the resistive load, and thus additional gain, basis the case in the previous embodiments. As a result, the configuration in FIG. 8 couples the zero generation circuit directly to the feedback voltage node of the controller circuit. The configuration shown in FIG. 8 is more flexible and can be readily incorporated in a wide variety of linear integrated circuits. For instance, while Figure a illustrates incorporating zero generation circuit 810 in a fixed switching regulator including an internal resistor structure, the same configuration can be applied to an adjustable switching regulator including an external resistor structure, as shown in FIG. 9.

FIG. 9 illustrates another embodiment of the present invention where the zero generation circuit is applied in an adjustable switching regulator 900 including an external voltage divider. In switching regulator 900, zero generation circuit 910 is coupled between the feedback terminal 904 receiving the feedback voltage $V_{FB}$ and a summing node in a summing circuit 922 in error amplifier 908. The operation of zero generation circuit 910 is the same as zero generation circuit 810 of FIG. 8. The placement of the voltage divider including resistors RE1 and RE2 external to switching regulator controller 930 has no impact on the operation of the zero generation circuit. Zero generation circuit 910 introduces a zero at the summing node which is summed with the error voltage from amplifier 920. The zero introduced in the feedback loop of switching regulator 900 has a wide range of effectiveness. Furthermore, because zero generation circuit 910 does not require an internal resistor to provide resistive load to increase gain, the zero generation circuit can be readily incorporated in adjustable switching regulator 900 without the need to include an internal resistor, as is the case in the configuration of FIG. 6.

Figure 10:
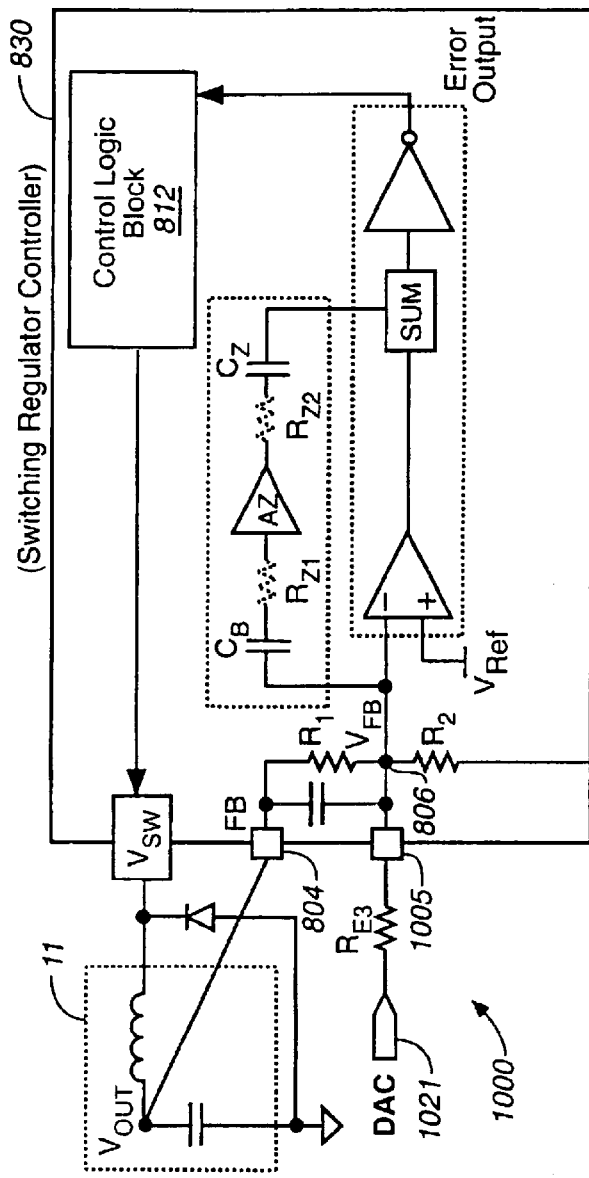
FIG. 10 is a schematic diagram illustrating an application of the switching regulator of FIG. 8 according to one embodiment of the present invention.

The configuration of zero generation circuit in FIG. 8 is also suitable for other circuit applications. FIG. 10 is a schematic diagram illustrating an application of the switching regulator of FIG. 8 according to one embodiment of the present invention. In FIG. 10, switching regulator controller 830 includes an additional input terminal 1005 which is coupled to the feedback voltage $V_{FB}$(node 806). Input terminal 1005 is coupled to receive an input signal from a digital-to-analog converter (DAC) on terminal 1021 through a resistor $R_{E3}$. The configuration in FIG. 10 allows a DAC signal to be applied to the feedback voltage $V_{FB}$. When thus configured, switching regulator 1000 becomes a switching regulator with a computer controlled output voltage. Input terminal 1005 allows a computer to send a signal to the switching regulator controller for setting or changing the desired output voltage $V_{OUT}$.

In sum, by placing the summing node where the zero is introduced at a point in the feedback loop where the zero is further amplified, the zero generation circuit can be coupled directly to the feedback voltage node of a circuit, thus allowing the zero generation circuit to be readily applied in any linear integrated circuits. When applied in a switching regulator, the zero generation circuit can be implemented in switching regulators using any voltage divider circuit structure, including internal or external voltage divider circuits. The present configuration simplifies design complexity and provides implementation flexibility.

Returning to FIG. 8, switching regulator controller 830 includes a compensation capacitor 818 coupled in parallel to resistor $R_1$ between the feedback terminal 804 and the feedback voltage node 806. Capacitor 818 is included to provide a minor pole cancellation for canceling a pole in the second gain stage (amplifier 824) of error amplifier 808. Capacitor 818 is optional and other methods for compensating for the minor pole in amplifier 824 may be used. In the case of an adjustable switching regulator, such as switching regulator 900 with an external resistor structure, the minor pole cancellation can be-provided using an external capacitor 918 coupled across external resistor RE1, as shown in FIG. 9. Again, capacitor 918 is optional and other means for pole cancellation can be used to compensate for the minor pole in amplifier 924.

Figure 11A:
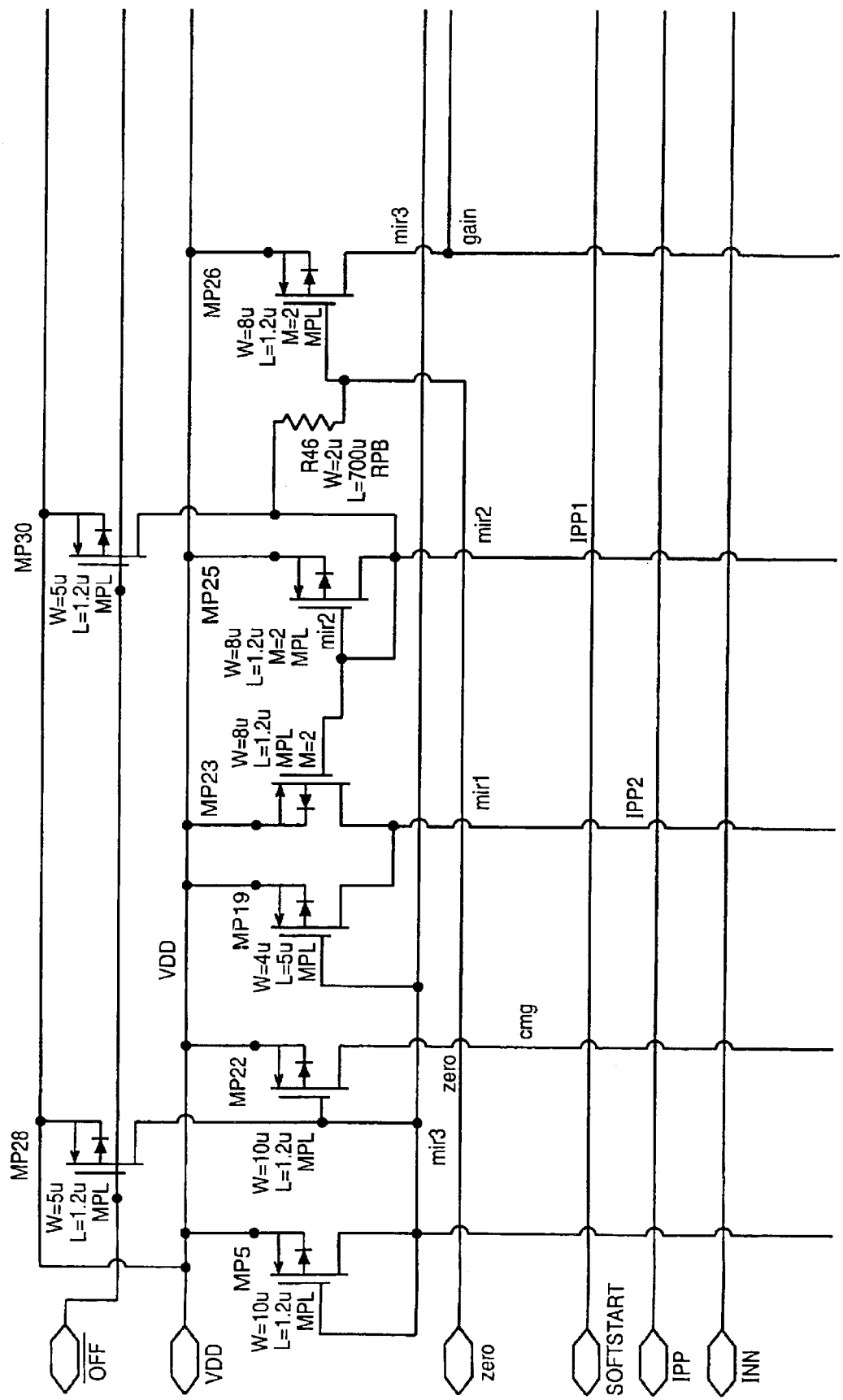
FIG. 11, consisting of FIGS. 11A, 11B, 11C and 11D, is a circuit diagram of an error amplifier circuit which can be used to implement the error amplifiers in FIGS. 8 and 9 according to one embodiment of the present invention.
Figure 11C:
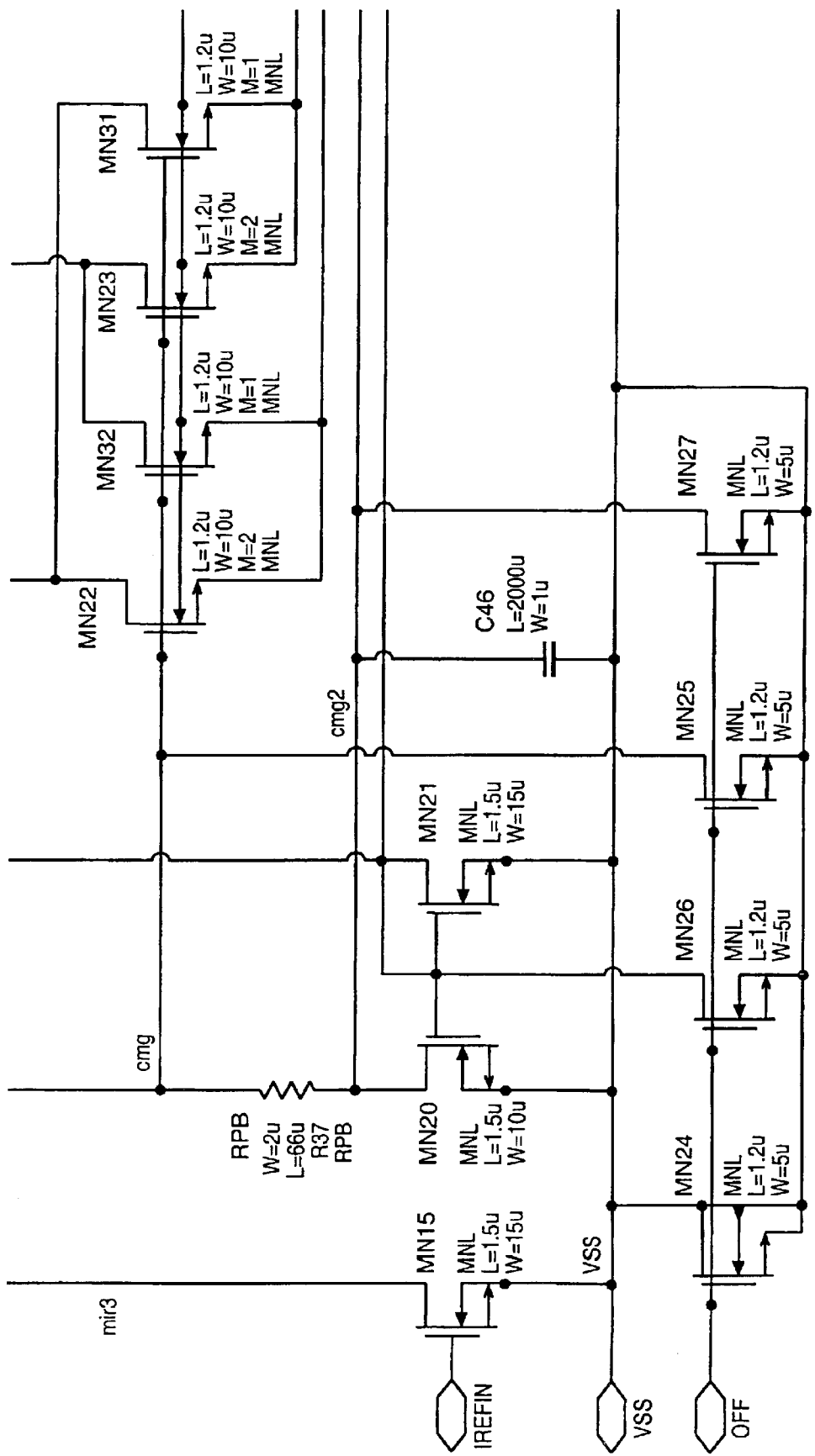
Figure 11D:
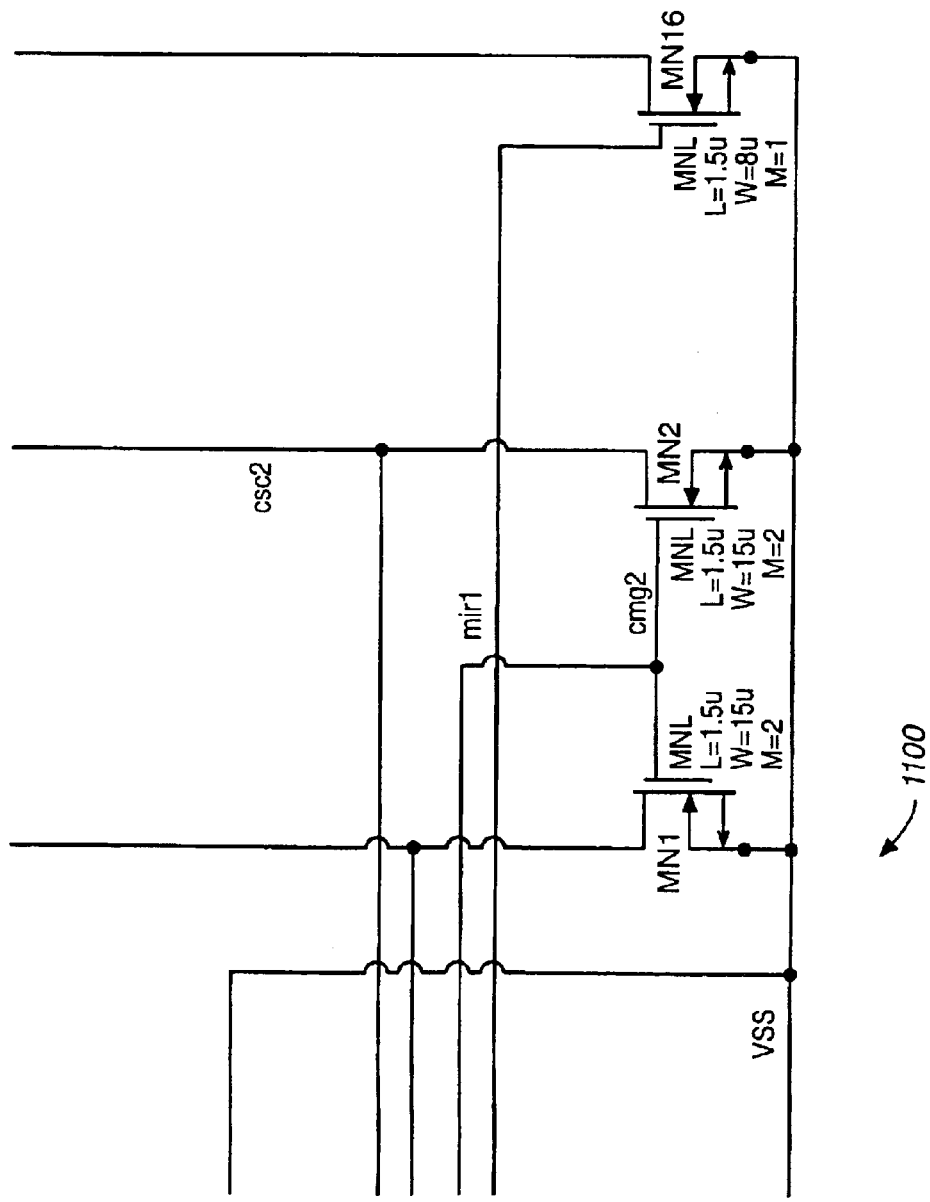

Error amplifiers 808 and 908 in FIGS. 8 and 9 can be implemented as any conventional two-stage error amplifiers including summing circuit 822. FIG. 11 illustrates an error amplifier circuit which can be used to implement error amplifiers 808 and 908 of FIGS. 8 and 9 according to one embodiment of the present invention. Error amplifier circuit 1100 is implemented using a 1.2 $\mu$m CMOS fabrication process. In FIG. 11, the notation "MN" preceding a reference number denotes an NMOS transistor while the notation "MP" preceding a reference number denotes a PMOS transistor. Referring to FIG. 11, error amplifier 1100 is a two-stage amplifier with a cascode amplifier as the first gain stage. The input terminal INN is the inverting input terminal for receiving the feedback voltage $V_{FB}$. The input terminals SOFTSTART and IPP provides the reference voltage $V_{Ref}$ for the error amplifier. Input signal SOFTSTART is a parallel reference signal to the IPP signal and is used at start-up of error amplifier circuit 1100 to ensure that the regulated output voltage $V_{SW}$ of the switching regulator is turned on slowly at start-up. Because the output terminal of the switching regulator controller is coupled to an LC filter circuit to provide a substantially constant regulator output voltage, voltage overshoot may result if the output voltage at the output terminal of the controller changes rapidly at circuit start-up. The SOFTSTART signal is provided to turn on the output voltage $V_{SW}$ slowly to avoid such a voltage overshoot condition.

Transistors MP1 and MP2 implement an analog OR function with input signals SOFTSTART and IPP. Transistors MP1 and MP2, together with transistor MP3 receiving the INN signal, form a comparator comparing the input signal at input terminal INN with the reference voltage provided at input terminal IPP. Transistors MN1 and MN2 provide the biasing current for the comparator. The output signals of the comparator (signals csc1 and csc2) are coupled to transistors MN22, MN23, MN31 and MN32. Transistors MN22, MN23, MN31 and MN32, together with transistors MP25 and MP26 form the cascode amplifier for the first gain stage. Transistors MN22, MN23, MN31 and MN32 are cross-coupled to reduce the gain of the first stage so as not to saturate the input to the second gain stage.

Transistors MP25 and MP26 form a differential to single-end converter of the first gain stage. A resistor R46, coupled between the drain terminal of transistor MP25 and the gate terminal of transistor MP26, functions as the summing circuit in error amplifier circuit 1100. The zero generated by the zero generation circuit (denoted "zero" in FIG. 11) is coupled to one terminal of resistor R46 where the zero is summed with the error output voltage $V_{EOUT1}$ of the first gain stage. Transistor MP26 generates the summed signal, denoted as "gain" in FIG. 11, on its drain terminal and the gain signal is coupled to the second gain stage of error amplifier circuit 1100.

The gain signal generated by transistor MP26 is coupled to the gate terminal of transistor MP17 forming the second gain stage of error amplifier circuit 1100. A resistor-capacitor (RC) network HS6 is coupled between the gate and drain terminal of transistor MP17. The RC network includes a resistor R and a capacitor C providing the pole and zero of the error amplifier, respectively. The output terminal denoted by "out" in FIG. 11 is the error output of error amplifier circuit 1100. In the present embodiment, resistor R of the RC network is a diffused capacitor and capacitor C of the RC network is a MOS capacitor.

Error amplifier circuit 1100 may include other supporting circuitry to facilitate the operation of the error amplifier. For example, error amplifier circuit 1100 includes transistors MN24, MN25, MN26 and MN27 controlled by an "OFF" signal operating to turn off the error amplifier circuit. A complementary set of transistors, transistors MP28, MP30, MP31, and MP32, controlled by the complement "OFF" signal, is also provided. Transistors MN15, MN20 and MN21 form current mirrors for providing bias current to the error amplifier circuit. In the embodiment shown in FIG. 11, error amplifier circuit 1100 includes a reset transistor MP34 controlled by an active-high "reset" signal. Reset transistor MP34 operates to pull the output node out" to a threshold voltage below the Vdd voltage when the circuit is turned on. In this manner, the output node is properly biased for efficient circuit operation.

In the implementation shown in FIG. 11, error amplifier circuit 1100 also includes an optional layout feature to provide an offset voltage at transistor MP3. In the comparator circuit including transistors MP1, MP2 and MP3, transistor MP2 receiving the SOFTSTART signal is only one half the size of transistor MP1. The sizing of transistor MP2 creates an offset voltage such that transistor MP3 is turned on slightly when the SOFTSTART is at 0 volt and the error amplifier circuit is turned on. Keeping transistor MP3 slightly on has the advantage of ensuing proper start-up of error amplifier circuit 1100 where the error amplifier is turned on subsequently by assertion of the SOFTSTART signal.

As is well known in the art, circuit layout rules and techniques can be applied in the implementation of error amplifier 1100 to achieve optimal circuit operation. In the present embodiment, selected groups of transistors in error amplifier 1100 are "matched" during circuit layout in order to minimize the offset of the error amplifier. The "transistor matching" layout technique is well known in the art and typically involves interdigitating the transistors to be matched. For example, to match a transistor A and a transistor B, each having a width of 40 $\mu$m, each of the two transistors is drawn as two transistor portions of 20 $\mu$m each in width. The four transistor portions of transistors A and B can be layout out in an "ABBA" configuration where the transistor portions of transistor A bonds the transistor portions of transistor B. Of course, the "ABBA" configuration is exemplary only and other techniques for transistor matching may be used. Referring to FIG. 11, transistors MP25 and MP26 in error amplifier circuit 1100 are matched; transistors MP1 and MP3 are matched; transistors MN1 and MN2 are matched; and finally, transistors MN22, MN23, MN31, MN32 are also matched.

Figures 12, 12B:
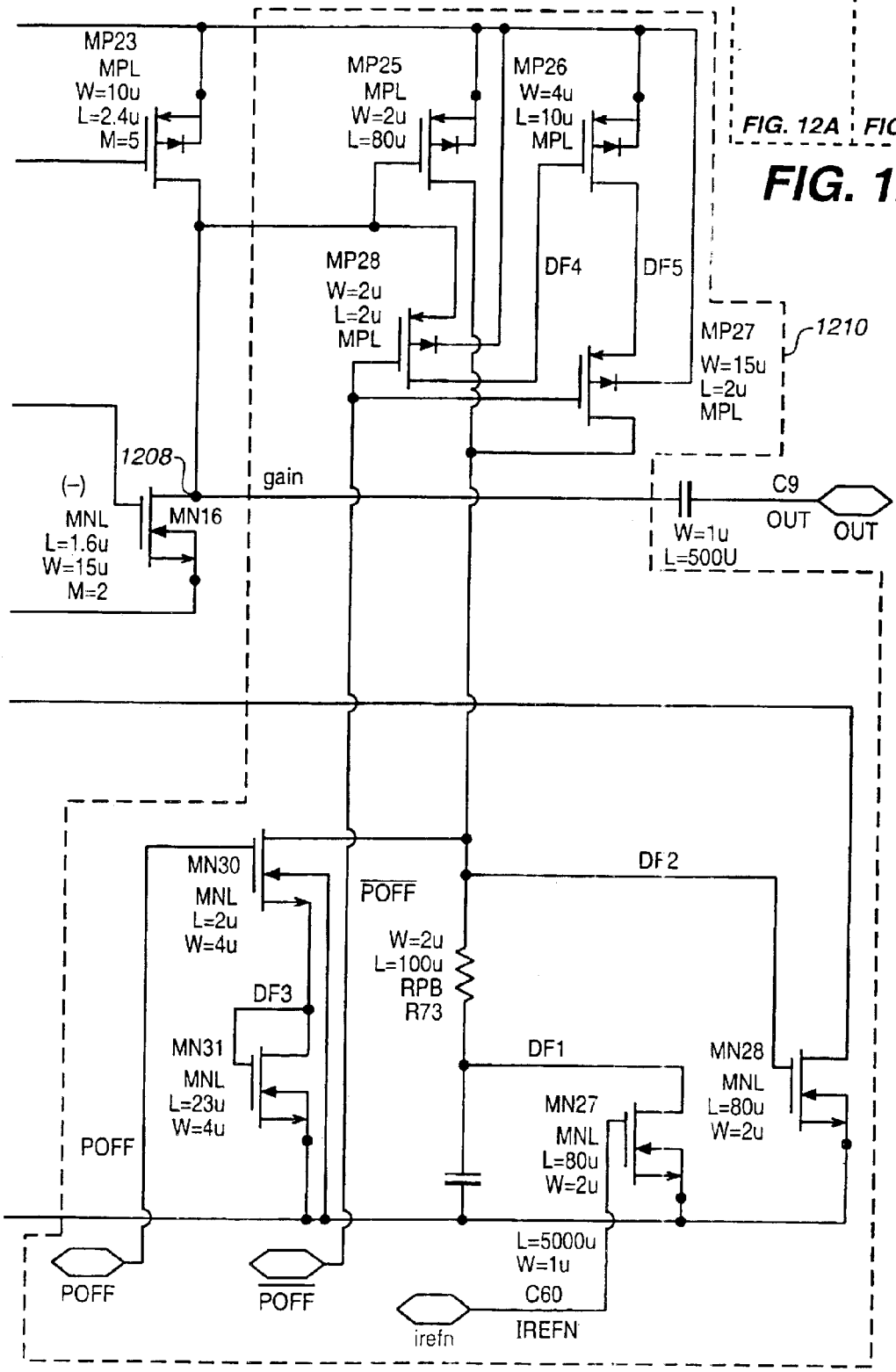
FIG. 12, consisting of FIGS. 12A and 12B, is a circuit diagram illustrating a zero generation circuit according to one embodiment of the present invention.
Figure 12A:
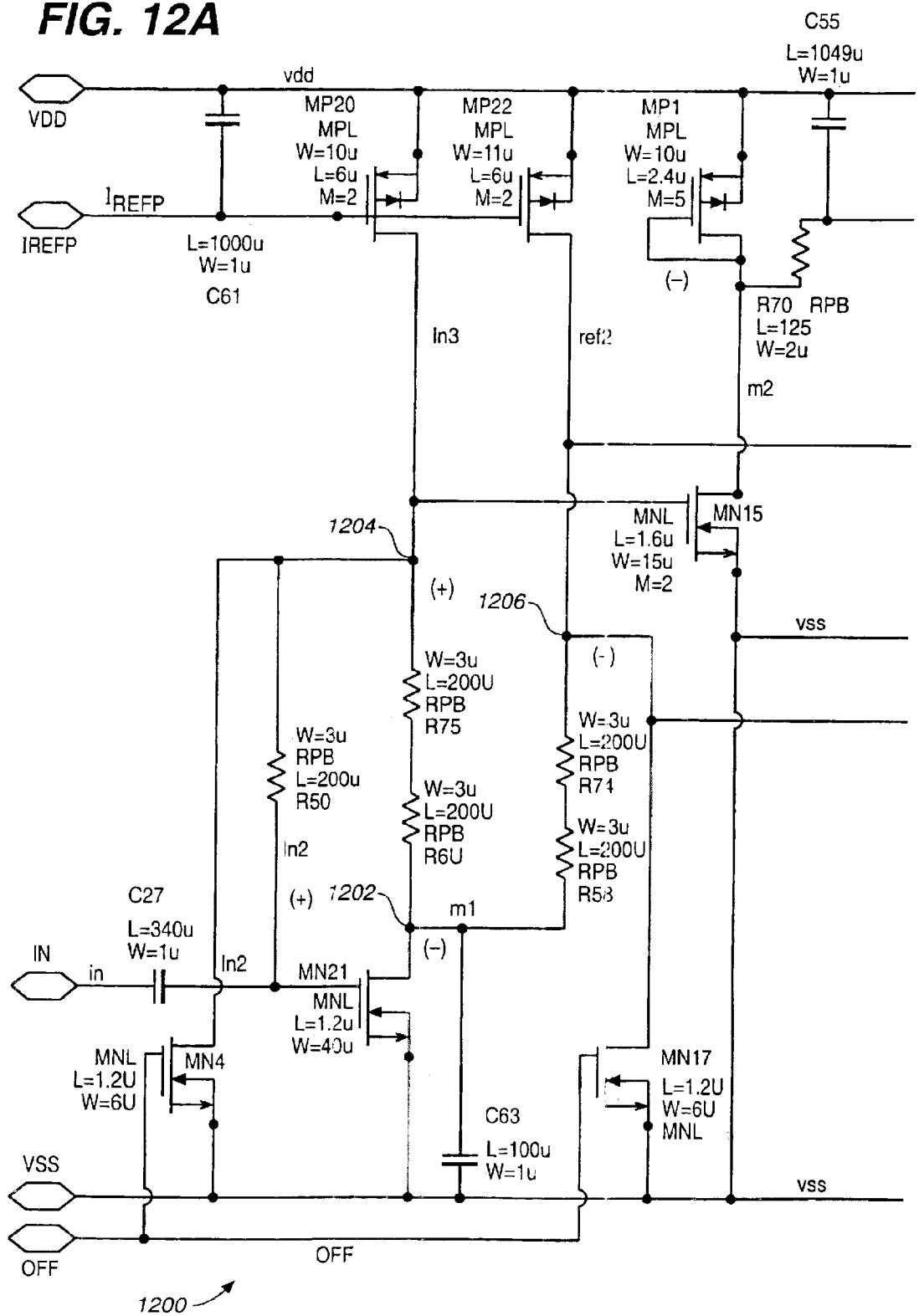

Returning to FIGS. 7–10, amplifier AZ of the zero generation circuit in each of FIGS. 7–10 is an open loop amplifier and can be implemented as any conventional gain stages known in the art. In one embodiment, the amplifiers AZ of the zero generation circuits of FIGS. 7–10 are implemented as shown in FIG. 5. FIG. 12 is a circuit diagram illustrating a zero generation circuit according to another embodiment of the present invention. FIG. 12 illustrates another implementation of amplifier AZ which can be applied in the zero generation circuit of the present invention to enhance the performance of the zero generation circuit.

In the present embodiment, zero generation circuit is fabricated using a 1.2 $\mu$m CMOS process. Similar to FIG. 11, the notation "MP" denotes a PMOS transistor and the notation "MN" denotes an NMOS transistor. Referring to FIG. 12, zero generation circuit 1200 includes a capacitor C27 functioning as the blocking capacitor $C_B$ and a capacitor C9 functioning as the zero capacitor $C_Z$. The amplifier AZ of zero generation circuit 1200 includes a single-end to differential converter stage, a differential amplifier stage and a differential to single-ended converter stage.

The single-ended to differential converter stage includes a transistor MN21a and a resistor network R58, R68, R74 and R75. The single-to-differential converter stage converts the input signal "IN" to a positive (+) and a negative (−) differential signals at nodes 1204 and 1206, respectively. The feedback path formed by resistor R50 between node 1204 and the gate terminal of transistor MN21a keeps the positive signal (node 1204) at a nearly constant voltage, thus allowing the negative signal (node 1206) to reacts strongly to any changes at the drain terminal (node 1202) of transistor MN21a. Thus, a slight change in voltage at node 1202 will cause only a small change in voltage at the positive signal (node 1204) but a large change in voltage at the negative signal (node 1206).

The differential output signals from the single-ended to differential converter stage are coupled to a differential amplifier formed by transistors MN15a and MN16a. The use of a differential amplifier has advantages over the single transistor amplifier implementation of FIG. 5 in that the differential amplifier operates at a faster speed and also rejects spurious substrate noise. In FIG. 12, capacitor C55 and resistor R70 are added to the differential amplifier for stabilization.

Finally, the differential output signal from the differential amplifier is converted back to a single-ended output signal by the operation of transistor MP23a. The single-ended output "gain" (node 1208) is the amplified AC component of the input signal "in" and is coupled to capacitor C9 to generate a zero at the output terminal "OUT," as shown in FIG. 12.

Zero generation circuit 1200 may include other supporting circuitry to facilitate the operation of the amplifier circuit. For example, zero generation circuit 1200 includes a current mirror formed by transistors MP20a and MP22a to provide a reference current to the resistor network. In the present embodiment, zero generation circuit 1200 further includes a bias feedback circuit 1210 demarcated by the dotted line in FIG. 12. Bias feedback circuit 1210 operates to hold the "gain" node (node 1208) at a voltage level that will provide the peak gain for the zero generation circuit. Specifically, bias feedback circuit 1210 operates through transistor MP25a to hold the gain node (node 1208) at a voltage level one threshold below the Vdd voltage. Capacitor C60 is provided to ensure that the operation of bias feedback circuit 1210 is very slow compared to the amplifier circuit in zero generation circuit 1210 so that the bias feedback circuit does not affect the operation of the zero generation circuit.

Bias feedback circuit 1210 receives as input signals a "POFF" signal and its complement. The POFF signal is provided to cause bias feedback circuit 1210 to either operate in a "fast" mode or a "slow" mode. When the POFF signal is asserted, bias feedback circuit 1210 operates in a fast mode to get amplifier AZ in the zero generation circuit into equilibrium very quickly. Then the POFF signal is deasserted to allow the bias feedback circuit to operate in the slow mode for regulating the voltage at the gain node (node 1208).

Figure 13:
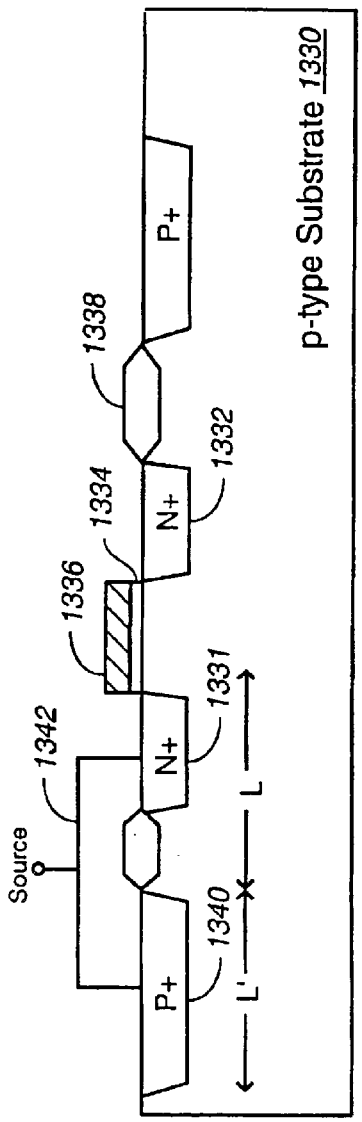
FIG. 13 illustrates an exemplary guard-ring structure which can be used in zero generation circuit of FIG. 12 according to one embodiment of the present invention.

In the present embodiment, transistors MN15*a* and MN16*a*, MN21*a*, MN27*a*, MN28*a* and MN31*a* are fabricated using extra guard-ring protection. The extra guard-ring protection is provided to shield the sensitive transistors from spurious substrate current which may affect the operational accuracy of the circuit. Of course, any conventional guard-ring structure may be used. FIG. 13 illustrates an exemplary guard-ring structure which can be used in zero generation circuit 1200 according to one embodiment of the present invention. FIG. 13 is a cross-sectional view of a single NMOS transistor including a N+ source terminal 1331, a N+ drain terminal 1332 and a gate terminal 1336 separated from a p-type substrate 1330 by a thin gate oxide layer 1334. A guard-ring structure 1340 consisting of a ring of p+ diffusion region surrounds the NMOS transistor. The length L' of guard-ring structure 1340 is at least equal to the distance L representing the distance to be guarded. The distance L is generally the distance from the channel of the transistor to the edge of the guard-ring. Guard-ring structure 1340 operates to absorb stray current in substrate 1330 to prevent the stray current from reaching the channel region and affecting the operation of the NMOS transistor. The use of extra guard-ring protection in zero generation circuit 1210 is optional. Furthermore, the guard-ring structure shown in FIG. 13 is illustrative only and other guard-ring structures may be used to shield the sensitive transistors in the amplifier AZ circuit from undesirable substrate current.

While the amplifier circuit of FIG. 5 or any conventional amplifier circuit can be used to implement the amplifier in the zero generation circuit of the present invention, the use of zero generation circuit 1200 of FIG. 12 provides several advantages. First, the use of a differential amplifier in amplifier AZ in FIG. 12 helps to eliminate substrate noise. When extra guard-ring protection is also provided, the effect of substrate noise can be substantially eliminated and the amplifier AZ can operate at a much higher degree of accuracy. Second, the inclusion of bias feedback circuit 1210 ensures that zero generation circuit 1200 can obtain maximum gain, despite process variations. In the circuit of FIG. 5, amplifier AZ relies on the ratio of the output impedance of NMOS transistor 508 to the PMOS transistor 504 to provide the proper bias for maximum gain. However, small process variations can cause the ratio of the output impedance of the transistors to change, thus affecting the gain and resulting in low manufacturing yield. On the other hand, the use of the bias feedback circuit in amplifier AZ enhances manufacturing robustness as the proper bias for the amplifier is no longer dependent upon manufacturing process variations. Thus, the use of zero generation circuit 1200 including bias feedback circuit 1210 can ensure maximum gain while improving manufacturing yield.

In one embodiment, the configuration of zero generation circuit shown in FIG. 8 is used to construct a high efficiency, high frequency synchronous step-down switching regulator (also known as a buck converter). A buck converter, constructed incorporating the zero generation circuit of the present invention, can operate at a frequency range of 500 kHz to 2 MHz while achieving 90% power conversion efficiency. Other applications of the zero generation circuit of the present invention will be apparent to those skilled in the art, upon being apprised of the present description.

Alternate Embodiment of Zero Generation Circuit

In the above embodiments of the present invention, the zero generation circuit includes a blocking capacitor, an amplifier AZ, and a zero capacitor where the amplifier operates to multiply the capacitance of the zero capacitor for introducing a zero having wide range of effectiveness. In the above description, the amplifier AZ of the zero generation circuit can be implemented as any conventional gain stages or implemented using the circuits shown in FIGS. 5 and 12. According to other embodiments of the present invention, the zero generation circuit can be constructed using one or more gain stages with a capacitive feedback loop. Such a zero generation circuit provides effective zero compensation, especially for feedback system operating at very high frequencies.

Figure 14:
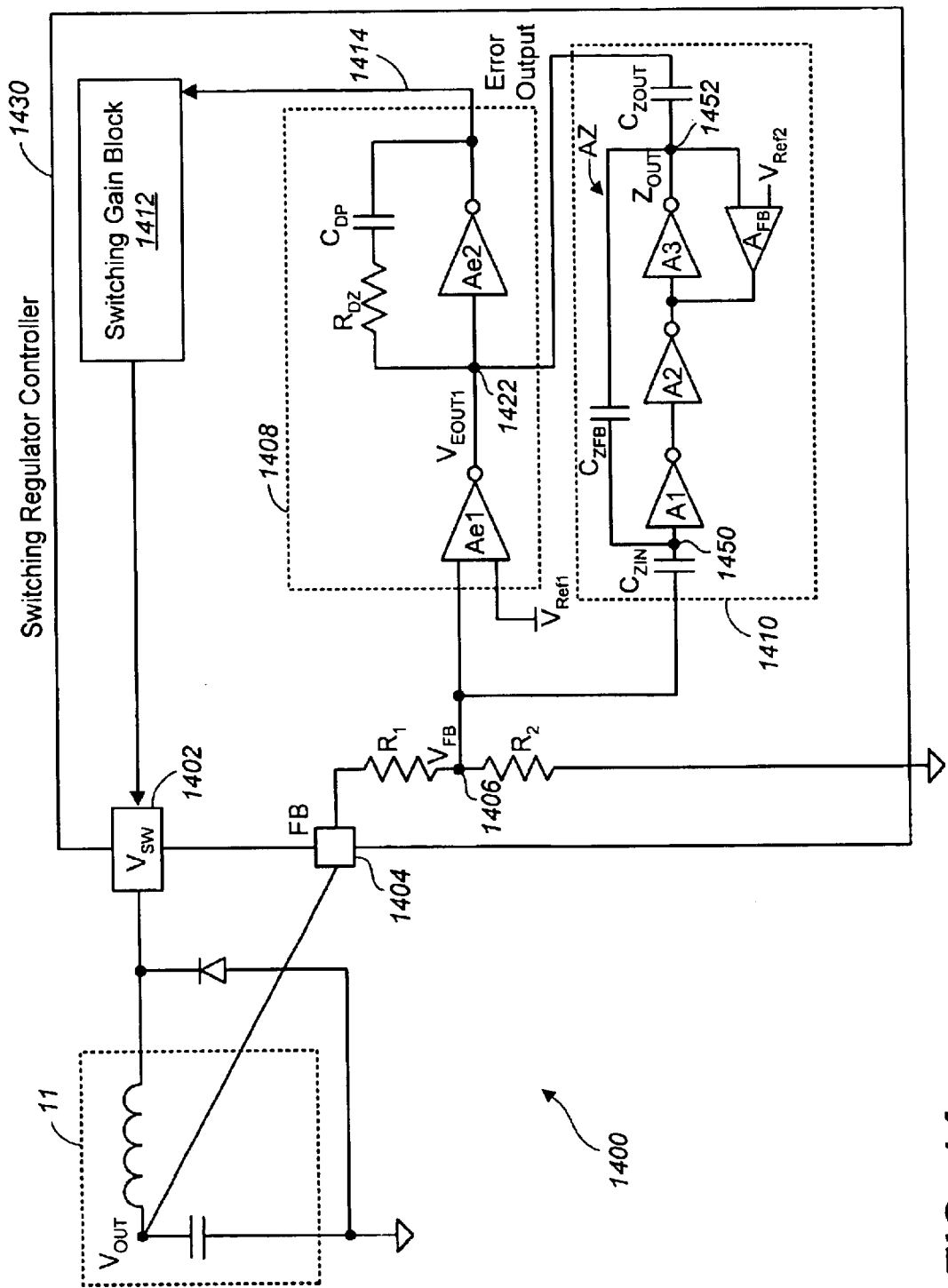
FIG. 14 is a schematic diagram illustrating a zero generation circuit according to an alternate embodiment of the present invention and further illustrates the incorporation of the zero generation circuit in a fixed switching regulator.

FIG. 14 is a schematic diagram illustrating a zero generation circuit according to an alternate embodiment of the present invention and further illustrates the incorporation of the zero generation circuit in a fixed switching regulator. Referring to FIG. 14, the control loop of switching regulator 1400 is established as follows. Switching regulator 1400 includes a switching regulator controller 1430 including an internal voltage divider implemented as resistors $R_1$ and $R_2$. The output voltage of the voltage divider (node 1406) is the feedback voltage $V_{FB}$ of switching regulator controller 1430 and is coupled to an input terminal of an error amplifier 1408. Error amplifier 1408 measures the difference between the feedback voltage $V_{FB}$ and a reference voltage $V_{Ref1}$ and generates an error output signal which operates to regulate the regulated output voltage $V_{SW}$ on node 1402 of the switching regulator controller.

In the embodiment shown in FIG. 14, error amplifier 1408 includes two gain stages. The first stage is a differential gain stage Ae1 for measuring the difference between voltage $V_{FB}$ and voltage $V_{Ref1}$ and generating an intermediate error output voltage signal $V_{EOUT1}$. The second stage is a gain stage Ae2 for amplifying the voltage signal $V_{EOUT1}$. Error amplifier 1408 typically has associated with it a pole and a zero created by a resistor $R_{DZ}$ and a capacitor $C_{DP}$ connected in series with gain stage Ae2. The pole and zero of error amplifier 1408 are sometimes referred to as the dominant pole and the dominant zero of the feedback system.

The output signal, error output, of error amplifier 1408 drives a switching gain block 1412 having an effective gain of As. The effective gain As is approximately equal to the ratio of the input voltage of gain block 1412 (i.e., the error output voltage) to the voltage of an oscillator signal coupled to the gain block (not shown in FIG. 14). Switching gain block 1412 generates the regulated output voltage $V_{SW}$ which is coupled to an LC filter circuit 11 external to controller 1430. The LC filter circuit 11 generates an output voltage $V_{OUT}$ having substantially constant magnitude. The output voltage $V_{OUT}$ from LC filter circuit 11 is fed back to controller 1430 on feedback terminal 1404, forming the closed loop feedback system. As described above, the output voltage $V_{OUT}$ is stepped down by resistors $R_1$ and $R_2$ to generate the feedback voltage $V_{FB}$ for used by error amplifier 1408 for comparison with reference voltage $V_{Ref1}$. Furthermore, LC filter circuit 11 introduces two poles to the feedback loop of switching regulator 1400 which need to be compensated.

In sum, prior to the application of any compensation, the control loop of switching regulator 1400 includes three poles and one zero. Thus, the phase shift of the feedback system, without applying any compensation, is near −180°, causing instability and resulting in ringing at the output voltage. To compensate the control loop of switching regulator 1400, a zero has to be added to the feedback system to boost the phase shift of the system to as close to −90° as possible. Conventional compensation schemes for switching regulators involve using a high gain, high speed amplifier to generate a zero for compensation. However, the conventional compensation schemes become difficult to implement and intractable when the unity gain crossover frequency increases to very high frequency. When the unity gain crossover frequency is high, the requirement for a wide band zero drives the bandwidth of the amplifier to an extremely high frequency, making the practical application of the conventional compensation schemes very difficult.

In accordance with another aspect of the present invention, a zero generation circuit for introducing a wide band Laplace transform zero in a linear or analog integrated circuit includes an input capacitor, an amplifier circuit with capacitive feedback, and an output capacitor. The zero generation circuit is capable of providing effective compensation in a closed loop feedback system even when the unity gain crossover frequency is very high. FIG. 14 illustrates a zero generation circuit 1410 according to one embodiment of the present invention where the zero generation circuit is incorporated in a switching regulator controller for providing compensation to the control loop of the switching regulator.

Referring to FIG. 14, zero generation circuit 1410 is coupled between voltage divider output node 1406 and a summing node 1422 between the two gain stages Ae1 and Ae2 of error amplifier 1408. Thus, zero generation circuit 1410 generates a zero at summing node 1422 which is further amplified by gain stage Ae2 of error amplifier 1408. In the present embodiment, gain stages Ae1 and Ae2 are each an inverting gain stage, such as an inverting amplifier. It is important to note that the exact polarity of the gain stages (i.e., inverting or non-inverting) in error amplifier 1408 is not critical to the principles of the present invention and is merely a matter of design choice in selecting the appropriate inverting and non-inverting amplifier, or a combination thereof, to generate an error output signal having the correct phase shift.

Zero generation circuit 1410 includes an input capacitor $C_{ZIN}$, an amplifier AZ with capacitive feedback and an output capacitor $C_{ZOUT}$, connected in series between node 1406 and summing node 1422. In the present embodiment, amplifier AZ in an inverting amplifier including inverting gain stages A1, A2 and A3 with gain stage A3 being the high gain stage. Amplifier AZ further includes a feedback capacitor $C_{ZFB}$ coupled between the input terminal and the output terminal of amplifier AZ. In other words, capacitor $C_{ZFB}$ is coupled between the input terminal of gain stage A1 (node 1450) and the output terminal of gain stage A3 (node 1452).

In operation, capacitor $C_{ZIN}$ receives feedback voltage $V_{FB}$ on node 1406 and functions to block out the DC component of the feedback voltage. The AC component of feedback voltage $V_{FB}$ is summed with the output signal $Z_{OUT}$ of gain stage A3 fed back through feedback capacitor $C_{ZFB}$. In effect, through the action of feedback capacitor $C_{ZFB}$, the input terminal to amplifier AZ becomes a summing node of the AC component of feedback voltage $V_{FB}$ and the AC component of output signal $Z_{OUT}$. The summed AC signal is then amplified by amplifier AZ. Thus, amplifier AZ is a fixed gain amplifier whose gain is controlled by the ratio of the capacitance of capacitor $C_{ZIN}$ to the capacitance of capacitor $C_{ZFB}$ (that is, $C_{ZIN}/C_{ZFB}$). The gain of amplifier AZ can then be selected by adjusting the values of capacitors $C_{ZIN}$ and $C_{ZFB}$. In the present embodiment, the gain of amplifier AZ is selected to be several hundreds. By incorporating a capacitive feedback loop in amplifier AZ through the use of capacitor $C_{ZFB}$, the output terminal of gain stage A3 can be made into a low impedance node, allowing gain stage A3 to drive capacitor $C_{ZOUT}$ more effectively.

At the output end of amplifier AZ, output signal $Z_{OUT}$ drives capacitor $C_{ZOUT}$ for introducing a zero signal in the feedback system of switching regulator 1400. The zero signal generated by capacitor $C_{ZOUT}$ is summed with immediate error output signal $V_{EOUT1}$ or at node 1422 and the summed signal drives the input terminal of gain stage Ae2. In operation, the input impedance of gain stage Ae2 (represented as 1/Gm) and the capacitance of capacitor $C_{ZOUT}$ form a Laplace transform zero where the gain of the summed signal increases with frequency. The effect of the addition of the Laplace transform zero in the feedback system of switch regulator 1400 is depicted in the Bode plot of FIG. 18.

Figure 18:
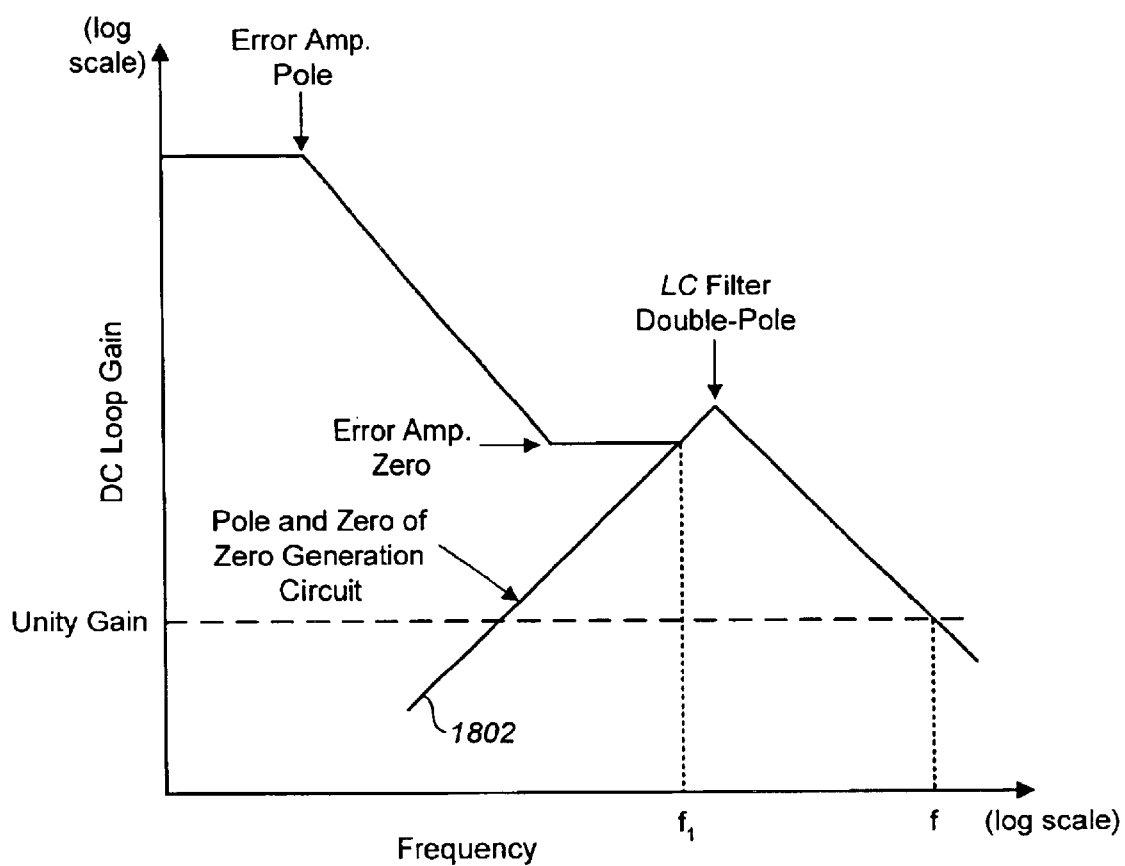
FIG. 18 is a bode plot (loop gain vs. frequency) of the feedback system of the switching regulator of FIG. 14.

FIG. 18 is a Bode plot (loop gain vs. frequency plot) of the feedback system of the switching regulator of FIG. 14. It should be noted that both the Bode plots of FIGS. 4 and 18 illustrate the frequency response of the switching regulator circuit, as shown in FIGS. 3, 6, 7A, 7B, 8–10 and 14, after the introduction of a zero in the feedback loop using the zero generation circuit of the present invention. However, the Bode plot in FIG. 18 illustrates in greater detail the operation and the result of introducing a zero using the zero generation circuit of the present invention. Referring to FIG. 18, curve 1802 represents the loop gain component introduced by the zero generation circuit 1410 of FIG. 14. The zero-pole pair of the zero generation circuit takes effect at frequency f1 where the double-pole from the LC filter circuit 11 takes effect. The result is that when the loop gain crosses unity gain, the phase shift is substantially far from zero degree and far less than −180° so that the feedback system is ensured to be stable.

As described above, conventional compensation schemes often involves the use of a high gain, high speed amplifier to introduce a zero for compensation. However, the use of high gain and high speed amplifier for compensation becomes problematic in high frequency applications. Specifically, when the unity gain crossover frequency increases, the requirement that the compensation schemes provide a wide band zero drives the bandwidth of such high gain, high speed amplifier to extremely high frequency. As a result, the conventional compensation schemes are difficult to design and implement. However, in accordance with the present invention, the zero generation circuit,-incorporating an input capacitor, an amplifier with capacitive feedback and an output capacitor, is capable of generating a "wide-band" zero having effectiveness over a large frequency range. Thus, the zero generation circuit of the present invention can be advantageously applied in feedback systems even when the unity gain cross-over frequency is at high frequency values to provide effective zero compensation.

Alternate Embodiments

In the present embodiment, amplifier AZ is an inverting amplifier. However, in other embodiments, depending on the insertion point of the zero signal, amplifier AZ can be implemented as an non-inverting amplifier to provide a zero signal having the correct phase shift. The exact polarity (inverting or non-inverting) of amplifier AZ is not critical to the principles of the present invention as long as proper signal polarity is maintained through the feedback loop. That is, the polarity of amplifier AZ is selected to provide a zero signal having the correct phase shift to be combined with the signals in the feedback system, such as the error output signal or the intermediate error output signal ($V_{EOUT1}$) depending on where the zero signal is inserted.

For instance, in the present embodiment, the requirement of the feedback loop dictates that the error output signal generated at the output terminal of error amplifier 1408 should be non-inverting. Thus, error amplifier 1408 includes two inverting gain stages Ae1 and Ae2 and provides a non-inverting error output signal. On the other hand, amplifier AZ in the zero generation circuit is an inverting amplifier. The zero signal generated by zero generation circuit 1410, having an inverted phase, is summed with intermediate output voltage signal $V_{EOUT1}$ at node 1422 and subsequently amplified and inverted by inverting gain stage Ae2. In this manner, an error output signal having an non-inverting phase shift is generated.

Furthermore, in the embodiment shown in FIG. 14, the zero signal is injected in the feedback loop at an intermediate point between the two gain stages of error amplifier 1408. In other embodiments, the zero generation circuit can be configured to introduce the zero signal at other points in the feedback loop of an linear integrated circuit for providing effective zero compensation and improving frequency stability of the linear integrated circuit. Thus, in one embodiment, zero generation circuit 1410 can be configured to generate a zero which is summed with the feedback voltage $V_{FB}$ at the input terminal of the error amplifier in a switching regulator controller, as shown in FIG. 3, where zero generation circuit 310 can be replaced with zero generation circuit 1410. In another embodiment, zero generation circuit 1410 can be configured to generate a zero which is summed with the error output signal of the error amplifier in a switching regulator controller, as shown in FIG. 7A, where zero generation circuit 710 can be replaced with zero generation circuit 1410.

In the above embodiments, the zero generation circuit of the present invention is applied in a fixed switching regulator. Zero generation circuit 1410 can of course be incorporated in a closed loop feedback system for an adjustable switching regulator. For instance, zero generation circuit 1410 can be configured to introduce a zero signal at the input terminal of the error amplifier in a regulator controller for an adjustable switching regulator, as shown in FIG. 6. Zero generation circuit 1410 can also be configured to introduce a zero signal at the output terminal of the error amplifier in a regulator controller for an adjustable switching regulator, as shown in FIG. 7B. Lastly, zero generation circuit 1410 can be configured to introduce a zero at an intermediate node between two gain stages of an error amplifier in a regulator controller for an adjustable switching regulator, as shown in FIG. 9. In sum, zero generate circuit 1410 can be applied to inject a zero signal in any closed loop feedback system for zero compensation and for improving stability.

It should be noted that amplifier AZ of zero generation circuit 1410 can be implemented with any number of gain stages. In the present embodiment, amplifier AZ includes three inverting gain stages with the last gain stage being the high gain stage. In other embodiments, amplifier AZ includes only a single gain stage where the single gain stage is a high gain stage. Of course, the polarity of the gain stage or stages in amplifier AZ is determined by the required phase shift at the location where the zero is to be injected.

The Autobias Circuit

Returning to FIG. 14, amplifier AZ of zero generation circuit 1410 includes only a capacitive feedback loop through capacitor $C_{ZFB}$. Therefore, amplifier AZ has no DC reference voltage on the output terminal. Because gain stage A3 is a high gain amplifier (e.g., a gain of 30), the high gain output node (node 1452) of gain stage A3 may swing from rail to rail if a DC reference voltage is not provided. Thus, in an alternate embodiment of the present invention, amplifier AZ includes a bias circuit for providing a DC reference voltage to output signal $Z_{OUT}$ at the output node of gain stage A3. Bias circuits for setting a DC reference voltage at a node of an integrated circuit are known. In accordance with the present invention, any conventional bias circuits can be applied to provide a DC reference voltage at output node 1452. Examples of conventional bias circuits include an integrator with a large capacitive feedback.

According to another aspect of the present invention, amplifier AZ of zero generation circuit 1410 includes an autobias circuit for setting the DC reference voltage level of high gain node 1452 so that the output signal $Z_{OUT}$ of gain stage A3 can be kept at a reasonable DC voltage level for proper operation of the zero generation circuit. Referring to FIG. 14, amplifier AZ includes an autobias circuit $A_{FB}$, depicted as an amplifier, coupled between the high gain output node (node 1452) and the input node of gain stage A3. Autobias circuit $A_{FB}$ receives as input signals the $Z_{OUT}$ signal and a reference voltage $V_{Ref2}$ and drives the input terminal of gain stage A3. In operation, autobias circuit $A_{FB}$ monitors output voltage $Z_{OUT}$ of gain stage A3 and compare voltage $Z_{OUT}$ with reference voltage $V_{Ref2}$. Based on the difference of the two input voltages, autobias circuit $A_{FB}$ adjusts the DC voltage at the input terminal of gain stage A3 in order to set the DC voltage level of output voltage $Z_{OUT}$ in the center of the active region of the gain stage. In effect, autobias circuit $A_{FB}$ operates to cancel out the voltage swing at output voltage $Z_{OUT}$ by keeping the DC level of voltage $Z_{OUT}$ at a predetermined optimal voltage level.

In the design of the autobias circuit, certain design constraints should be considered to ensure that the operation of the circuit will not interfere with the operation of amplifier AZ and ultimately the operation of the zero generation circuit. For example, if the bandwidth of autobias circuit $A_{FB}$ is too large and the gain of the autobias circuit is too large, the speed of the autobias control loop can be very fast and can interfere with the actual signal propagating through amplifier AZ. For instance, a very fast responding autobias circuit $A_{FB}$ can change the output signal of amplifier AZ or may actually cancel out the output signal. Thus, a slow-speed autobias circuit is desired. However, the autobias circuit also needs to be able to respond as fast as possible to avoid a long settling time.

To prevent signal interference caused by the autobias circuit, the gain-bandwidth product of the autobias control loop needs to be set to less than a given threshold value where interference with the signal path of amplifier AZ is avoided. In one embodiment, the gain-bandwidth product of the autobias control loop is set to be less then 3 kHz. The 3 kHz threshold is chosen because the bandwidth of the autobias control loop has be to lower than the frequency at which the zero signal generated by the zero generation circuit becomes effective. Referring to FIG. 18, the gain-bandwidth product threshold of the autobias control loop should have a frequency much less than frequency $f_1$, the frequency at which the zero signal crosses the dominant zero point of the frequency response of the switching regulator control loop. In the present embodiment, limiting the gain-bandwidth to a 3 kHz threshold is sufficient to prevent interference while providing effective DC voltage adjustment.

Referring to FIG. 14, the gain of the autobias control loop is the product of the gain of gain stage A3 and the gain of autobias circuit $A_{FB}$. Thus, the gain-bandwidth product of the autobias control loop is constrained as follows:

$$A_{FB} \times A3 \times BW \leq 3 \text{ kHz}$$

where $A_{FB}$ and A3 denote the gain of the respective gain stages, and BW denotes the bandwidth of the control loop. If gain stage A3 has a gain of 30, the gain of autobias circuit $A_{FB}$ can be set to be approximately 1/30. However, the design constraint of a 3 kHz gain-bandwidth product requires that the bandwidth of autobias circuit $A_{FB}$ to be less than 3 kHz all by itself. Conventional techniques for designing a differential amplifier having reduced gain and a narrow bandwidth involve the use of large resistors or large capacitors. Large resistors and large capacitors are very area-intensive and thus are not practical in most applications.

Figure 15:
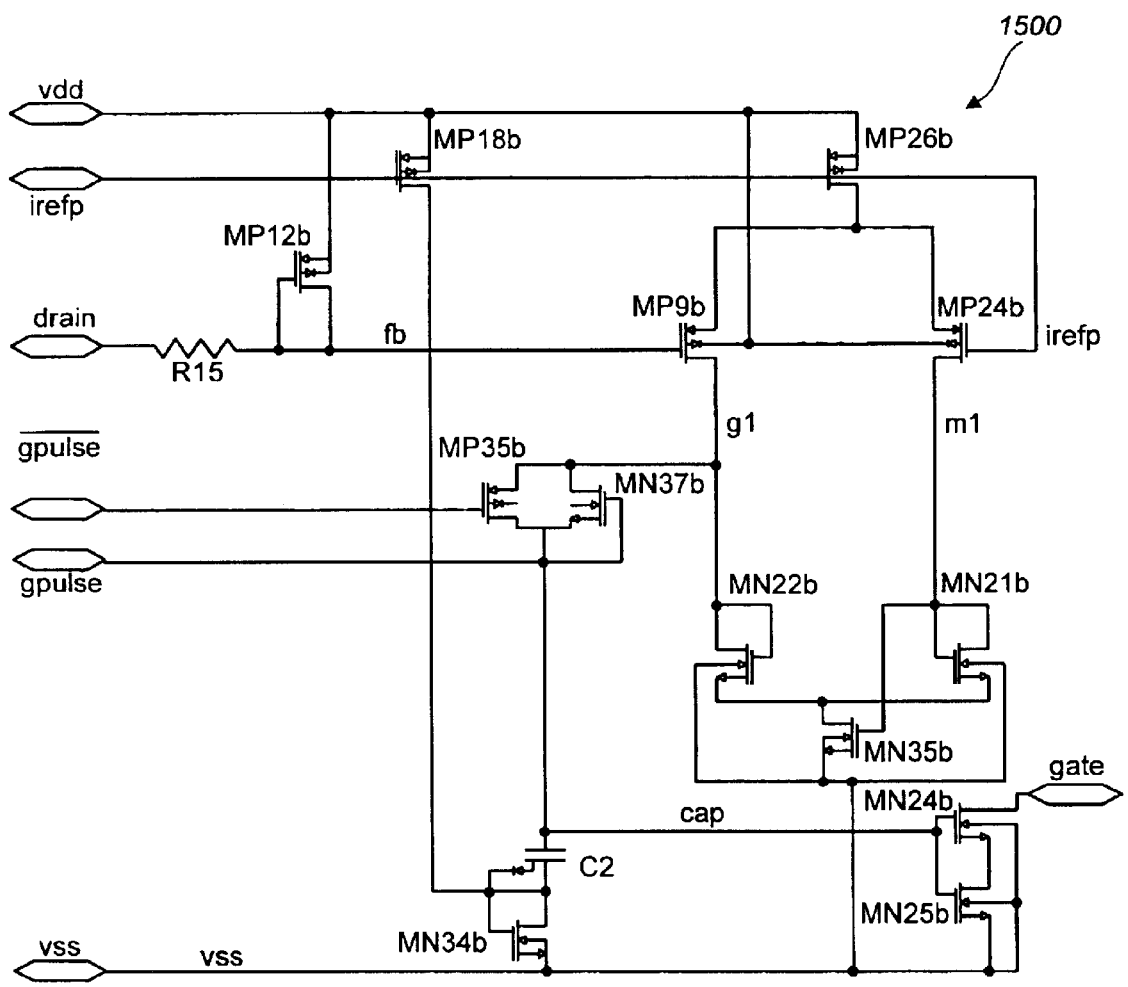
FIG. 15 is a circuit diagram illustrating an autobias circuit employing a switched resistor circuit according to one embodiment of the present invention.

According to another aspect of the present invention, the autobias circuit includes a switched resistor circuit or a switched capacitor circuit to realize a reduced gain and a narrow bandwidth differential amplifier. The autobias circuit of the present invention is suitable for use in amplifier AZ of zero generation circuit 1410 for correcting the DC drive of output signal $Z_{OUT}$ and providing a DC reference level for the output signal without interfering with the actual signal propagating through amplifier AZ. FIG. 15 is a circuit diagram illustrating an autobias circuit employing a switched resistor circuit according to one embodiment of the present invention. In FIG. 15 and in the following figures, the notation "MN" preceding a reference number denotes an NMOS transistor while the notation "MP" preceding a reference number denotes a PMOS transistor.

Referring to FIG. 15, autobias circuit 1500 includes a resistor R15 and a diode-connected transistor MP12b as gain-reduction elements for reducing the gain of the input signal (signal $Z_{OUT}$) received on the input terminal (denoted "drain") to a desired level. Resistor R15 and transistor MP12b are connected in series with the signal path of the input signal and operates to reduce the gain of the input signal (signal $Z_{OUT}$) before the signal is compared with the reference voltage $V_{Ref2}$.

Autobias circuit 1500 also includes a differential amplifier comparing the input signal (signal $Z_{OUT}$) and reference voltage $V_{Ref2}$ (provided by the current reference signal $I_{Refp}$). Current reference signal $I_{refp}$ is also used to bias transistor MP18b and MP26b for generating reference currents at the drain terminals of the respective transistors. The differential amplifier includes a transistor MP9b having a gate terminal coupled to receive the input signal, a transistor MP24b having a gate terminal coupled to receive the reference signal $I_{refp}$, and transistor MP26b for providing a bias current. The output nodes of the differential amplifier (denoted "g1" and "m1") are driven into diode-connected MOS transistors MN22b and MN21b for gain reduction. The differential amplifier of autobias circuit 1500 also includes a transistor MN35b functioning as a non-linear gain element. Transistor MN35b is coupled between the source terminals of transistors MN21b and MN22b and the Vss terminal. In operation, when the currents at the diode-connected transistors MN21b and MN22b are offset from each other, such as when the current in transistor MN21b is less than the current in transistor MN22b, the voltage on node g1 will rise above the voltage level of the normal diode characteristics. The additional voltage boost helps the autobias circuit recover in large signal transient conditions.

Figure 16:
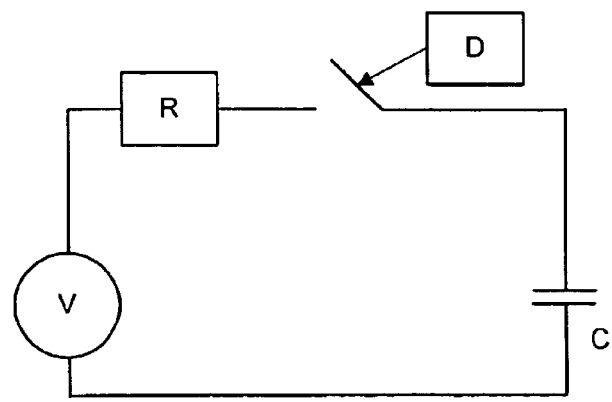
FIG. 16 is representative circuit diagram of a switched resistor circuit.

The output signal of the differential amplifier (on node g1) is connected to a switched resistor circuit which functions as the final and primary gain reduction element. FIG. 16 is representative circuit diagram;of a switched resistor circuit. A switch resistor circuit includes a resistor R connected in series with a capacitor C through a switch controlled by a signal having a duty cycle of D. If the switch is simply closed, the time constant of the circuit is RC. However, if the switch is opened and closed with a duty cycle of D, the time constant of the circuit becomes RC/D. Thus, by setting the duty cycle of the switch to a small value (e.g., 1%), the RC time constant of the circuit is multiplied by a large number (e.g. 100). The only requisite on the operation of the switched resistor circuit is that the duty cycle (or the switching frequency) must be higher than the RC time constant of the circuit. In that case, the circuit functions as a resistor whose resistance is multiplied by the inverse of the duty cycle factor. In this manner, a very large resistance can be derived from a relatively small resistor.

Returning to FIG. 15, the switch resistor circuit in autobias circuit 1500 is implemented as a transmission gate and a capacitor C2. The output signal of the differential amplifier (node g1) is coupled to a capacitor C2 through the transmission gate. In the present embodiment, the transmission gate is constructed using a PMOS transistor MP35b and an NMOS transistor MN37b. The control terminals of the transmission gate (the gate terminals of transistors MP35b and MN37b) are driven by a low duty cycle signal "gpulse" and its complement so that both transistors MP35b and MN37b turn on or off in unison according to the gpulse signal. The operation of the gpulse signal turning on and off the transmission gate (transistors MP35b and MN37b) has the effect of multiplying the impedance of diode-connected transistor MN22b by the inverse of the duty cycle factor of the gpulse signal. In one embodiment, the duty cycle of the gpulse signal is 2% and the impedance of transistor MN22b is multiplied by 50 times. In this manner, the bandwidth of autobias circuit 1500 is reduced by 50.

The gain and bandwidth reduction realized by the use of the gain reduction elements and the switched resistor circuit in autobias circuit 1500 allows the autobias circuit to meet the gain-bandwidth product requirement of 30 kHz for the autobias control loop. Thus, autobias circuit 1500 can provide effective correction of the DC drift of the output signal $Z_{OUT}$ without affecting the actual $Z_{OUT}$ signal when the autobias circuit is incorporated in amplifier AZ of zero generation circuit 1410 (FIG. 14).

The output signal from the switched resistor circuit (on node "cap") is coupled to drive the gate terminals of transistors MN24b and MN25b. Transistors MN24b and MN25b are connected in series between the output terminal (denoted "gate") of autobias circuit 1500 and the Vss voltage. Transistors MN24b and MN25b drive the input terminal of the third gain stage A3 in amplifier AZ for setting the DC reference level of the output signal ($Z_{OUT}$) at the output terminal of the third gain stage A3.

When autobias circuit 1500 is incorporated in amplifier AZ (FIG. 14), capacitor $C_{ZOUT}$ of the zero generation circuit adds a pole to the autobias control loop. Thus, a zero must be added to autobias circuit $AF_{FB}$ to improve the AC stability. In the present embodiment, a diode-connected transistor MN34b is added to autobias circuit 1500 for introducing the zero. Transistor MN34b is coupled between capacitor C2 and the Vss voltage and is biased by transistor MP18b receiving the current reference signal $I_{refp}$ as the bias signal. Transistor MN34b introduces a zero in the autobias control loop to cancel out the effect of the pole introduced by capacitor $C_{ZOUT}$.

Besides achieving the desired gain and bandwidth reduction, the use of a switched resistor circuit in autobias circuit 1500 realizes other advantages. For instance, in operation, the gpulse signal is activated to close the transmission gate (transistors MP35b and MN37b) during the startup of the autobias circuit. In the manner, the output signal of the differential amplifier is coupled directly to capacitor C2 which has the effect of reducing the settling time of the autobias circuit. In one embodiment, the settling time can be reduced by a factor of 20 to 50 times, speeding up the initialization of the switching regulator. After the startup operation, the signal gpulse begins to cycle as previously described.

In the embodiment shown in FIG. 15, autobias circuit 1500 implements gain reduction by using a switched resistor circuit. A switched resistor circuit is more suited for autobias circuit 1500 when the gpulse signal is a high frequency, low duty cycle signal. However, in other embodiments, a switched capacitor circuit can also be used in the autobias circuit in place of the switched resistor circuit to achieve a high resistance for gain reduction. The switched capacitor circuit is similar to the switched resistor circuit of FIG. 16 except that the resistor R is replaced with a switch in series with a small capacitor and the capacitor C is replaced with a large capacitor. Charge from the voltage source (representing the input node of the switched capacitor circuit) is transferred from the small capacitor to the large capacitor by the operation of the two switches that are driven by clocks signals in two phases. Thus, the first switch closes to transfer charge from the voltage source to the small capacitor while the second switch is open. Then, the first switch opens and the second switch is closed to transfer charge from the small capacitor to the large capacitor. The effective resistive current flow in such a switched capacitor circuit is V*C1*F where C1 is the capacitance of the small capacitor and F is the switching frequency. The effective resistance is thus 1/(C1*F). By making the capacitance of capacitor C1 very small or the frequency F very small, a large effective resistance can be realized in such a switched capacitor circuit.

Figure 17:
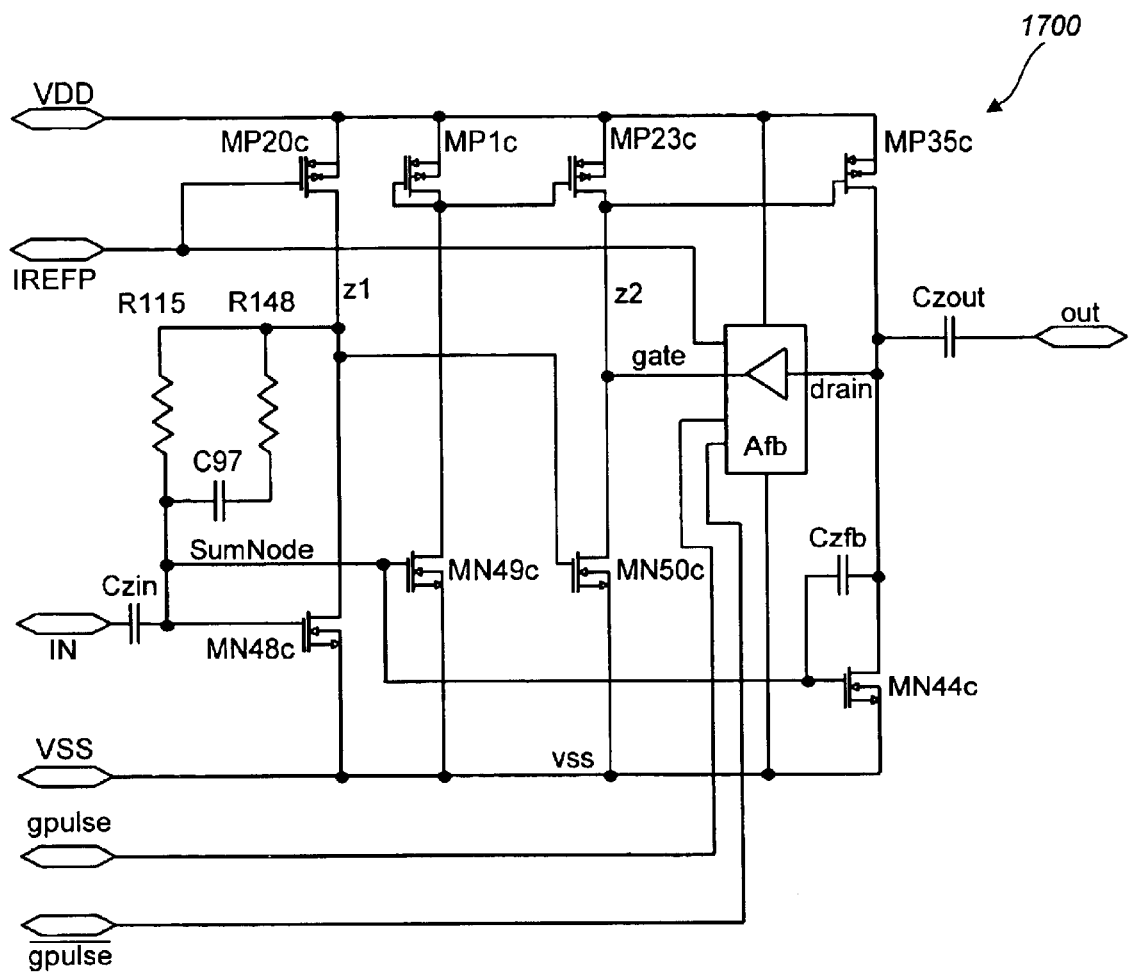
FIG. 17 is a circuit schematic of a zero generation circuit incorporating the autobias circuit of FIG. 15 according to one embodiment of the present invention.

FIG. 17 is a circuit schematic of a zero generation circuit incorporating autobias circuit 1500 according to one embodiment of the present invention. Referring to FIG. 17, zero generation circuit 1700 receives the feedback voltage signal $V_{FB}$ on an input terminal denoted "IN". A capacitor $C_{ZIN}$ is coupled between the input terminal IN and the input terminal of the first gain stage A1 (i.e., the gate terminal of transistor MN48c). The gate terminal of transistor MN48c is the summing node (denoted as "SumNode") for the capacitive feedback path provided by capacitor $C_{ZFB}$. In FIG. 17, capacitor $C_{ZFB}$ is shown as an explicit capacitive component. In actual implementation, the gate-to-drain overlap capacitance of transistor MN44c contributes to a significant portion of the capacitance of capacitor $C_{ZFB}$ so that an explicit capacitor $C_{ZFB}$ may be omitted. As described above, the ratio of the capacitance $C_{ZIN}/C_{ZFB}$ is the overall gain of amplifier AZ of zero generation circuit 1700. The zero signal is generated at the output terminal (denoted "out") by driving signal $Z_{OUT}$ (node "drain") through a capacitor $C_{ZOUT}$.

Zero generation circuit 1700 includes a resistor R148 and a capacitor C97 for introducing a pole having the effect of extinguishing the gain of circuit 1700 over a specified frequency. This gain reduction is particularly important when the zero generation circuit is applied in a switching regulator because the gain of the zero generation circuit needs to be reduced at the switching frequency of the switching regulator. Capacitor C97 also serves the function of stabilizing the capacitive feedback loop of zero generation circuit 1700.

In the present embodiment, zero generation circuit 1700 includes amplifier AZ having three gain stages A1, A2 and A3. The first gain stage A1 is a single stage amplifier including transistor MN48c biased by a transistor MP20c. The DC operating point of gain stage A1 is set by the resistance of resistor R115. In operation, capacitor $C_{ZIN}$ and resistor R115 function as a differentiator. When the input signal is summed with the feedback signal from capacitor $C_{ZFB}$ at the SumNode, a flat gain signal $Z_{OUT}$ will be generated at the drain node.

In gain stage A1, a differential signal is generated between SumNode and a node "Z1", the output node of gain stage A1. The DC voltage at the SumNode sets the bias current in transistors MN49c and MN44c. Transistor MN49c, together with transistor MN50c form the second gain stage A2 of amplifier AZ. The output signal from the first gain stage (on node "Z1") is coupled to the gate terminal of transistor MN50c. Transistors MP1c and MP23c form a current mirror providing the bias current for gain stage A2. If transistors MN49c, MN50c, MP1c and MP23c are perfectly matched, the voltage on the output node of gain stage A2 (node "Z2") would be in the high gain active region.

However, in the event that the transistors in gain stage A2 are not perfectly matched, autobias circuit $A_{FB}$ operates to set the DC reference level of the signal on node Z2 so that output signal from the second gain stage A2 remains biased in the high gain active region. In the present embodiment, transistor MN49c is made larger "electrically" than transistor MN50c, such as by making the width of transistor MN49c larger than the width of transistor MN50c, so that the voltage on node Z2 will tend to saturate towards the high power supply voltage Vdd. Autobias circuit $A_{FB}$ thus operates to pull the voltage at node Z2 down into the high gain active region such that both the output voltage of gain stage A2 and the output voltage of gain stage A3 ($Z_{OUT}$) are biased in the high gain active region.

The third and final gain stage of amplifier AZ includes transistor MN44c biased by a transistor MP35c. The gate terminal of transistor MN44c is connected to the SumNode because the gate-drain overlap capacitance contributes to a significant portion of the feedback capacitance $C_{ZFB}$. Gain stage A3 generates the $Z_{OUT}$ signal (on node drain) which drives capacitor $C_{ZOUT}$. The output terminal (node "out") of zero generation circuit 1700 is coupled to the appropriate location in a linear integrated circuit for introducing a Laplace transform zero for compensation.

As shown in FIG. 17, the input terminal (node drain) of autobias circuit $A_{FB}$ is coupled to the output terminal of gain stage A3. The output terminal (node "gate") of autobias circuit $A_{FB}$ is coupled to node Z2, the output terminal of gain stage A2 which is also the input terminal to gain stage A3.

Error Amplifier

Figure 19:
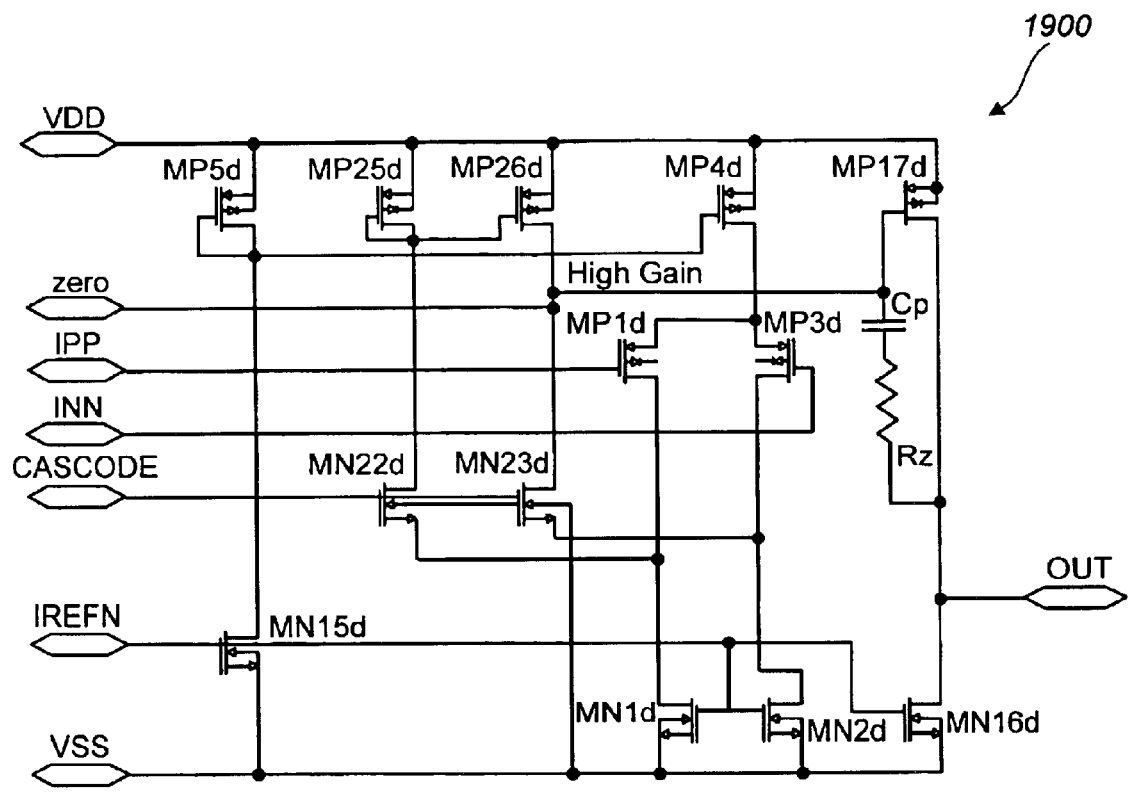
FIG. 19 is a circuit diagram of an error amplifier according to one embodiment of the present invention.

FIG. 19 is a circuit diagram of an error amplifier according to one embodiment of the present invention which can be used to implement error amplifier 1408 in the switching regulator controller of FIG. 14. Although other two-stage error amplifiers can be used in the switching regulator controller of the present invention, the use of error amplifier 1900 in FIG. 19 offers particular advantages, as will be apparent in the following discussions.

Referring to FIG. 19, the first gain stage (Ae1) of error amplifier 1900 includes a differential amplifier with a cascode gain stage. The differential amplifier includes a transistor MP1d receiving the reference voltage $V_{Ref1}$ (on input terminal IPP) as input voltage and a transistor MP3d receiving the feedback voltage $V_{FB}$ (on input terminal INN) as input voltage. The differential amplifier is powered by a current source made up of transistor MP4d. The current supplied by transistor MP4d is steered by the differential stage (transistors MP1d and MP3d) into transistors MN1d and MN2d.

Figure 20A:
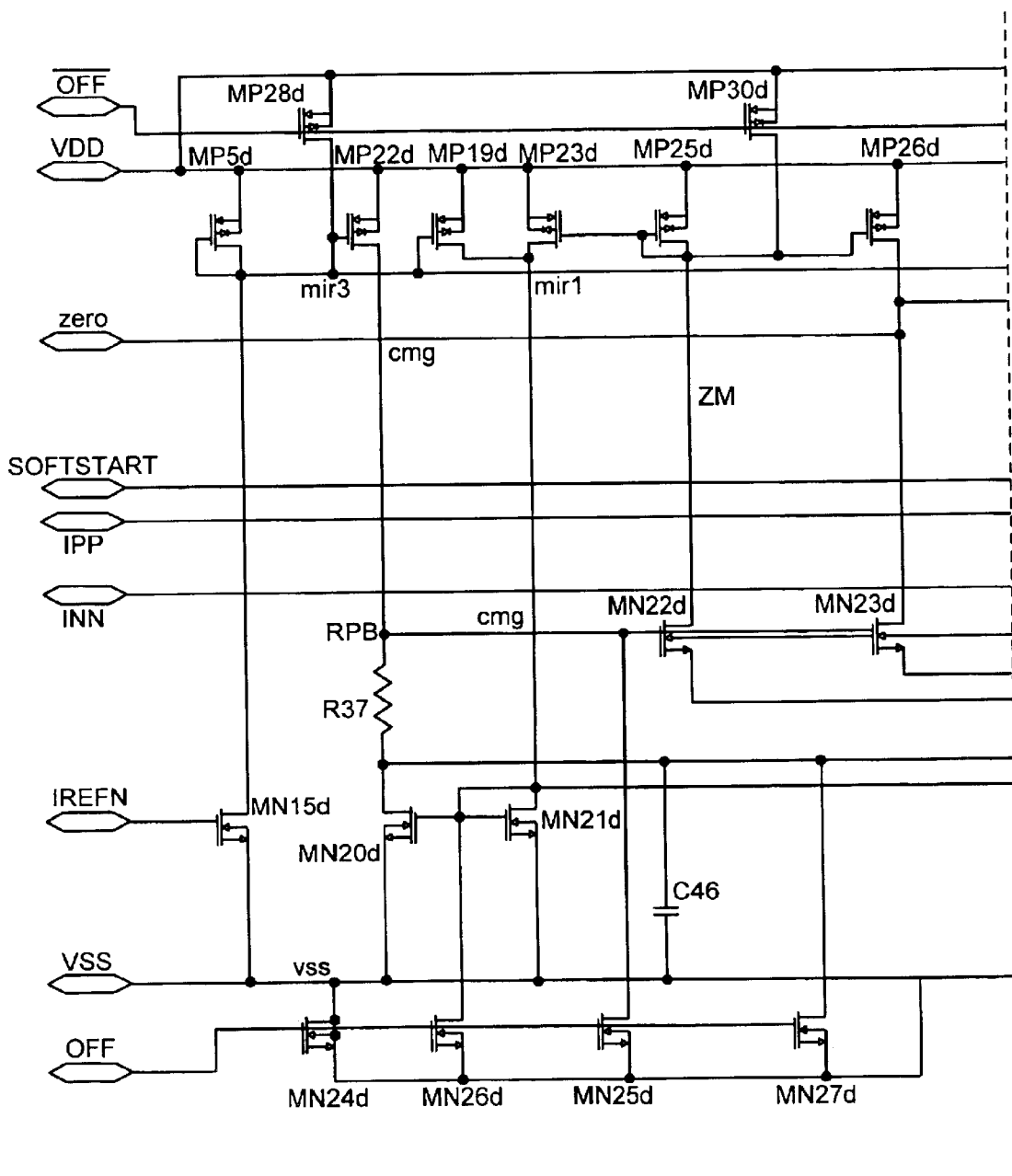
FIG. 20 is a detailed circuit diagram of an error amplifier according to another embodiment of the present invention.
Figure 20B:
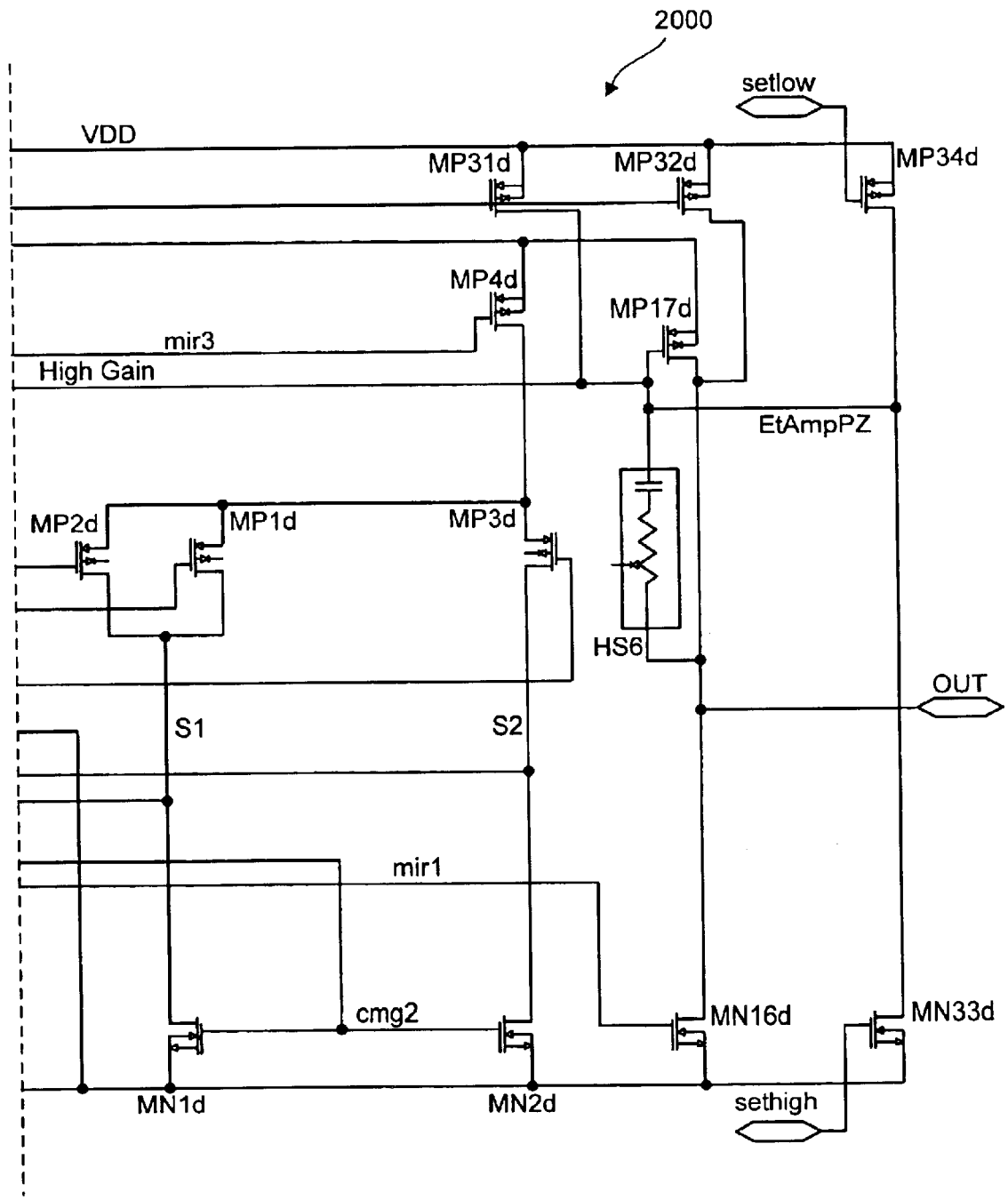

Transistors MN22d and MN23d form the cascode gain stage and are coupled to the output nodes S1 and S2, respectively, of the differential amplifier. A transistor MN15d, receiving a reference current input IREFN, establishes a reference current which is transferred to a transistor MP5d for establishing a reference voltage referred to the Vdd supply voltage. The reference voltage is used to set up a reference current in transistors MP25d and MP26d (a more detailed circuit connection is shown in FIG. 20 and will be explained further below). The output node of the cascode stage (denoted "High Gain") is the intermediate node between the two gain stages of error amplifier 1900 where the zero signal is introduced and summed with the differential amplifier output signal.

The second gain stage (Ae2) of error amplifier 1900 is formed by a transistor MP17d which is the gain device for the gain stage. The summed signal on the High Gain node drives the gate terminal of transistor MP17d. Transistor MP17d is biased by a transistor MN16d which is driven by the reference current IREFN. A resistor-capacitor (RC) network is coupled between the gate and drain terminals of transistor MP17d. The RC network includes a resistor R and a capacitor C providing the dominant pole and dominant zero of the error amplifier, respectively. The output terminal of the second gain stage Ae2 (denoted as node "OUT") provides the error output of error amplifier 1900.

FIG. 20 is a detailed circuit diagram of an error amplifier according to another embodiment of the present invention. FIG. 20 incorporates the basic two-stage amplifier circuit of the error amplifier of FIG. 19 but includes additional circuit structures to support and improve the operation of the error amplifier circuit. Like elements in FIG. 19 and FIG. 20 are given like reference numerals to simplify the discussion.

Referring to FIG. 20, the first gain stage Ae1 of error amplifier 2000 includes a differential amplifier and a cascode gain stage similar to that shown in FIG. 19. In error amplifier 2000, a pair of transistors MP1d and MP2d, connected in parallel, form one branch of the differential input terminals of the differential amplifier. Transistors MP1d and MP2d form an "analog OR" configuration where the transistor with the lower gate voltage takes over as the conductive path of the differential amplifier. Transistor MP1d receives a reference voltage signal "SOFTSTART" which is a parallel reference signal to the voltage reference signal $V_{Ref1}$. The SOFTSTART signal is used at start-up of error amplifier circuit 2000 to ensure that the regulated output voltage $V_{SW}$ of the switching regulator is turned on slowly at start-up. In operation, the SOFTSTART signal rises slowly during start-up and the regulated output voltage $V_{SW}$ tracks the SOFTSTART signal voltage until the reference voltage $V_{Ref1}$ is reached. At that time, the precision reference voltage $V_{Ref1}$ controls and the input voltage transitions smoothly from the SOFTSTART signal to the reference voltage $V_{Ref1}$.

The voltages at cascode nodes S1 and S2 are determined by transistors MN22d and MN23d, forming the cascode gain stage, and the voltage at a node "cmg" driving the gate terminals of transistors MN22d and MN23d. The voltage at node cmg is formed by a secondary feedback loop. The secondary feedback loop is a feature of the error amplifier 2000 of the present invention and provides improvements in the operation of the error amplifier, such improvements not realized in conventional error amplifier circuits.

The secondary feedback loop is formed as follows. A transistor MN15d, driven by a reference current signal IREFN, set up a reference current on the drain terminal (node mir3) of the transistor. The reference current is transferred to a transistor MP5d to create a reference voltage referred to the Vdd supply voltage. A second reference current is set up in a transistor MP22d based on the reference voltage. The second reference current from transistor MP22d is compared to the current sensed in transistor MN22d (through the cmg node). The sensed current on the drain terminal of transistor MN22d is transferred to a transistor MP25d which establishes a second reference voltage referred to the VDD supply voltage. The second reference voltage sets up a current in a transistor MP23d which transfers the current to a transistor MN21d. Transistor MN21d transfers the current to a transistor MN20d where the current comparison is made in the high gain node cmg.

The current flowing through transistor MN20d develops a voltage across a resistor R37. The voltage at the lower end of resistor R37 (node cmg2) is applied to the gate terminals of transistors MN1d and MN2d. The voltage at the upper end of resistor R37 (node cmg) is applied to the gate terminals of the cascode transistors MN22d and MN23d. This arrangement ensures that transistors MN1d and MN2d are held in the saturation region. Furthermore, transistor MP25d and transistor MP4d are sized such that the two transistors generate equal currents. The equal current requirement in transistors MP25d and MP4d ensures that in equilibrium, when the voltage difference between input terminals IPP and INN is zero, the current in each of transistors MN1d and M142d is equal to the current in MP4d. A capacitor C46, coupled between node cmg2 and the Vss voltage, is provided to stabilize the secondary feedback loop.

In this manner, the secondary feedback loop is established. The operation of the secondary feedback loop has the result of keeping the current in transistor MP25d substantially constant over variations in the differential input voltage between input terminals IPP and INN. One benefit of incorporating the secondary feedback loop in error amplifier 2000 is that the gain of the first gain stage Ae1 is doubled. The first gain stage Ae1 generates an output voltage on the High Gain node where the zero signal is introduced. The increased gain of the output voltage ensures proper summing of the zero signal at the High Gain node. Another benefit of the second feedback loop is that the speed of the first gain stage Ae1 is increased, thereby increasing the speed of operation of the error amplifier circuit.

At the second gain stage Ae2 of error amplifier 2000, the output voltage of the first gain stage Ae1, summed with the zero signal (on node "zero"), drives the gate terminal of a transistor MP17d. Transistor MP17d is biased by a transistor MN16d which is driven by a bias current on node mir1 which is part of the secondary feedback loop. This arrangement allows the currents in a transistor MP26d and transistor MP17d to be tracked in a constant ratio.

A RC circuit (denoted HS6), including a resistor and a capacitor connected in series, is coupled between the gate and drain terminals of transistor MP17d. As described above, the resistor and the capacitor introduce the dominant pole and the dominant zero of the error amplifier circuit. Specifically, the size of the capacitor sets the location of the dominant pole in the feedback control loop and the resistance of the resistor sets the location of the dominant zero in the feedback control loop. The RC circuit is designed to drive a small capacitive loads on the output terminal (node OUT) of error amplifier 2000. The selection of the capacitance and resistance values for the RC circuit is critical as large capacitance with small resistance values will upset the control loop and produce an offset in the error amplifier.

Error amplifier 2000 includes features to facilitate the efficient operation of the circuit. For instance, in circuit operation, error amplifier 2000 can be operated under conditions where the output node is turned off and the output voltage is zero, or where the output node is turned on fully with the output voltage at the input voltage value. To ensure an orderly transition between these two extremes in circuit operation, error amplifier 2000 includes two control signals "setlow" and "sethigh". The setlow signal drives a transistor MP34d and the sethigh signal drives a transistor MN33d. When the sethigh signal is expressed, the output terminal of error amplifier 2000 is slewed high by pulling the High Gain node to the ground voltage. When the setlow signal is expressed, the output terminal of error amplifier 2000 is slewed to the ground voltage by pulling the High Gain node to the Vdd supply voltage. Note that the polarities of the sethigh and setlow signals are selected in a conventional manner for driving the respective transistors MP34d and MN33d. In the present embodiment, the sethigh signal is an active high signal while the setlow signal is an active low signal.

The use of the sethigh and setlow signals in error amplifier 2000 also offers other advantages. For example, in normal operating conditions, the error amplifier is turned on but the output voltage of the switching regulator, in which the error amplifier is incorporated, may be artificially skewed to the ground voltage or the input voltage. In that case, the error amplifier would react accordingly to correct for the skewed condition. As a result, the output voltage of the error amplifier would move in the opposite direction. However, in the present embodiment, the sethigh and setlow signals operate to set the output voltages of the first and second gain stages in the error amplifier to a level as if the error amplifier itself was responsible for the skew at the output voltage of the switching regulator. The gain nodes in error amplifier 2000 would be set to voltage levels which would cause the error amplifier to be responsible for the artificial skew condition, which voltage levels are opposite to the voltages that would result in the absence of the control signals. In this manner, the sethigh and setlow control signals operate to ensure a normal recovery of the error amplifier from skewed conditions without or with substantially lessened, overshoot of the output voltage of the switching regulator.

In error amplifier 2000, transistors MN24d, MN26d, MN25d, MN27d, MP28d, MP30d, MP31d, and MP32d are used for turning off error amplifier 2000 to a low leakage position when required in response to the OFF signal.

Unity Gain-Bandwidth Product

As described above, zero generation circuit 1410 can be used to introduce a Laplace transform zero at different locations in the closed loop feedback system of switching regulator 1400 for providing effective zero compensation. For instance, zero generation circuit 1410 can be coupled to introduce a zero in an intermediate node in error amplifier 1408, as shown in FIG. 14. In other embodiments, zero generation circuit 1410 can also be coupled to introduce a zero at the input terminal to or the output terminal of error amplifier 1408. However, introducing the zero signal at the intermediate node of error amplifier 1408, as illustrated in FIG. 14, has specific advantages. Specifically, the unity gain-bandwidth product of the feedback system can be well controlled as the unity gain bandwidth is a function of device parameters of which only a few are process dependent. Therefore, the closed loop feedback system in which zero generation circuit 1410 is incorporated is exceptionally stable across manufacturing processing variations.

The gain-bandwidth product of the feedback system of switching regulator 1400 can be estimated from first order calculations as follows. The gain of switching gain block 1412 can be estimated as:

$$As = Vin/Vosc \quad (6)$$

where Vin is the input voltage to the switching gain block, i.e., the error output voltage from error amplifier 1408 and Vosc is the voltage of the oscillator signal coupled to the gain block (not shown in FIG. 14).

The gain of zero generation circuit 1410, denoted Aza, can be estimated as the gain of amplifier AZ as follows:

$$Aza = C_{ZIN}/C_{ZFB} \quad (7)$$

where $C_{ZIN}$ is the capacitance of capacitor $C_{ZIN}$ and $C_{ZFB}$ is the capacitance of capacitor $C_{ZFB}$.

The gain of error amplifier 1408, denoted Aerr, is the product of the gain of the two gain stages Ae1 and Ae2 of the error amplifier and can be estimated as follows:

$$Aza = GM_{Ae1}*R_{oe1}*GM_{Ae1}*R_{oe2} \quad (8)$$

where $Gm_{Ae1}$ and $Gm_{Aea}$ denote the transconductances of gain stage Ae1 and Ae2, respectively, and $R_{oe1}$ and $R_{oe2}$ denote the output impedances of the respective gain stages Ae1 and Ae2.

The gain-bandwidth product of the feedback system is a function of the time constants associated with the various functional block of the system. First, the time constant associated with LC filter circuit 11 is given as:

$$\tau_{LC} = \sqrt{L*C} \quad (9)$$

where L and C denote the inductance and capacitance of filter circuit 11 external to switching regulator controller 1430. The time constant associated with the dominant pole in error amplifier 1408 is given as:

$$\tau_P = Gm_{Ae2}*R_{oe2}C_{DP}*R_{oe1} \quad (10)$$

where $C_{DP}$ is the capacitance of capacitor $C_{DP}$ in error amplifier 1408. The time constant associated with the dominant zero in error amplifier 1408 is given as:

$$\tau_Z = R_{DZ}*C_{DP} \quad (11)$$

where $R_{DZ}$ is the resistance of resistor $R_{DZ}$ in error amplifier 1408.

The time constant associated with the zero added by zero generation circuit 1410 is given as:

$$\tau_{ZA} = Aza*C_{ZOUT}/Gm_{Ae2} \quad (12)$$

where $C_{ZOUT}$ is the capacitance of capacitor $C_{ZOUT}$ of zero generation circuit 1410.

Finally, the unity gain-bandwidth product, $F_{ugbw}$, of the feedback system of switching regulator 1400 can be estimated as follows:

$$F_{ugbw} = \frac{Aerr * As * \tau_{2A} * \tau_Z}{\tau_P * \tau_{LC}^2}. \quad (13)$$

By substituting the terms defined above into equation 13, the unity gain-bandwidth product of the feedback system can be expressed as:

$$F_{ugbw} = \frac{Gm_{Ae1}}{Gm_{Ae2}} * \frac{C_{ZOUT} * R_{DZ} * Aza}{L * C} * As. \quad (14)$$

From equation 14, it can be observed that the unity gain-bandwidth product is a function of the transconductances (Gm's) of the gain stages of the error amplifier, the gain of the zero generation circuit, the capacitance of capacitor $C_{ZOUT}$ and the resistance of resistor $R_{DZ}$. The transconductances $Gm_{Ae1}$ and $Gm_{Ae2}$ are device dependent parameters and should be similarly process dependent. Thus, the ratio of the two transconductances would be constant across process variations. The gain of the switching gain block As is dependent upon Vin and Vosc. As long as the switching gain block is designed to remove the dependency of As on Vin and Vosc, the value of gain As would be constant over process variations also. Otherwise, As would be an application dependent parameter and varies depending on the design of the switching gain block. The gain of the zero generation circuit Aza is a ratio of two capacitors. Therefore, gain Aza should be relatively constant over process variations. The inductance and capacitance of LC filter circuit 11 are typically components external to the switching regulator controller and their values can be made to be reasonably constant.

Thus, the only two terms left in the unity gain-bandwidth product $F_{ugbw}$ that can have substantial process variations are the product of $C_{ZOUT}$ and $R_{DZ}$. Hence, the variation of the unity gain-bandwidth product due to manufacturing process variation is limited. In most cases, the variation in the unity gain-bandwidth product is about ±30% which is remarkably small for an important device parameter in the feedback system. Simulation results confirm that even for large process and temperature variations, the feedback system incorporating the zero generation circuit of the present invention exhibits relatively small variations of the unity gain-bandwidth product. A switching regulator incorporating the zero generation circuit in the feedback system of the present invention exhibits exceptionally stability across process and temperature variations, such stability result cannot be readily realized in feedback systems using conventional compensation techniques.

Modifications

The above detailed descriptions are provided to illustrate specific embodiments of the present invention and are not intended to be limiting. Numerous modifications and variations within the scope of the present invention are possible. For example, while the above descriptions describe incorporating the zero generating circuit of the present invention in a switching regulator controller, the zero generating circuit of the present invention can be incorporated in any linear circuits being operated in a closed loop feedback system to ensure frequency stability. Also, while the implementation of the zero generation circuit has been described using CMOS devices, the circuit can also be implemented using bipolar devices to provide the same frequency stabilizing result. Furthermore, while in the present descriptions, the voltage divider of controller 330 includes two resistors $R_1$ and $R_2$, a person of ordinary skill in the art would appreciate that the voltage divider can be implemented using any numbers of resistors to produce the desired divided voltage. Lastly, while the above embodiments describe coupling the autobias circuit to the last gain stage of the zero generation circuit, this is illustrative only and in other embodiments, the autobias circuit can be coupled between the output terminal of amplifier AZ and the input terminal of any one of the multiple gain stages in amplifier AZ. The present invention is defined by the appended claims.

I claim:

1. An error amplifier circuit comprising:
    a differential amplifier receiving a first input signal and a second input signal, said differential amplifier generating an output signal on an output terminal indicative of the difference between said first input signal and said second input signal;
    a cascode gain stage coupled to received said output signal of said differential amplifier and generating a second output signal, said cascode gain stage being biased by a bias current generated by a current mirror; and
    an amplifier receiving said second output signal from said cascode gain stage and generating a third output signal;
    wherein said cascode gain stage is biased by a control signal for causing said current mirror to generate said bias current having substantially constant magnitude over variations in voltage differences of said first input signal and said second input signal; and
    wherein said differential amplifier comprises:
        a first transistor having a control terminal coupled to receive said first input signal, a first current handling terminal coupled to a second bias current and a second current handling terminal coupled to a second current mirror; and
        a second transistor having a control terminal coupled to receive said second input signal, a first current handling terminal coupled to said second bias current and a second current handling terminal coupled to said second current mirror;
    wherein said second current handling terminal of said first transistor and said second transistor form said output terminal of said differential amplifier.

2. The circuit of claim 1, wherein said cascode gain stage comprises:
    a third transistor having a control terminal coupled to a first node, a first current handling terminal receiving said bias current and a second current handling terminal coupled to said second current handling terminal of said first transistor of said differential amplifier;
    a fourth transistor having a control terminal coupled to said first node, a first current handling terminal receiving said bias current and a second current handling terminal coupled to said second current handling terminal of said second transistor of said differential amplifier;
    a fifth and a sixth transistors forming said current mirror, said fifth and sixth translators having control terminals coupled to a second node and current handling terminals generating said bias current;
    a seventh transistor having a control terminal coupled to said second node, a first current handling terminal coupled to a first supply voltage and a second current handling terminal coupled to a third current mirror;

said third current mirror having an input terminal receiving said bias current and an output terminal coupled to a third node;

a resistor coupled between said first node and said third node; and a reference current source generating a reference current driving said first node;

wherein said reference current and said bias current are compared at said first node for generating said control signal at said control terminals of said third and fourth transistors such that said bias current flowing through said third and fourth transistors is substantially constant over variations in voltage differences of said first input signal and said second input signal.

3. The circuit of claim 2, wherein said second current mirror of said differential amplifier is coupled to receive a second control signal at said third node.

4. The circuit of claim 1, wherein said first and second traitors comprise p-type MOSFET transistors.

5. The circuit of claim 2, wherein said third and fourth transistors comprise n-type MOSFET traitors, said fifth, sixth, and seventh transistors comprise p-type MOSFET transistors, and said first supply voltage comprises a Vdd power supply voltage.

6. An error amplifier circuit comprising:

a differential amplifier receiving a first input signal and a second input signal, said differential amplifier generating an output signal on an output terminal indicative of the difference between said first input signal and said second input signal;

a cascode gain stage coupled to receive said output signal of said differential amplifier and generating a second output signal, said cascode gain stage being biased by a bias current generated by a current mirror; and an amplifier receiving said second output signal from said cascode gain stage and generating a third output signal;

wherein said cascode gain stage is biased by a control signal for causing said current mirror to generate said bias current having substantially constant magnitude over variations in voltage differences of said first input signal and said second input signal; and wherein said amplifier comprises:

a first transistor having a control terminal receiving said second output signal from said cascode gain stage, a first current handling terminal coupled to a first supply voltage and a second current handling terminal coupled to a bias current source and providing said output signal; and a resistor and a capacitor connected in series between said control terminal and said second current handling terminal of said first transistor.

7. The circuit of claim 6, wherein said bias current source comprises a second transistor having a control terminal receiving a reference voltage, a first current handling terminal coupled to said second current handling terminal of said first transistor and a second current handling terminal coupled to a second supply voltage.

8. The circuit of claim 7, wherein said first transistor comprises a p-type MOSFET transistor, said second transistor comprises an n-type MOSFET transistor, said first supply voltage comprises a Vdd power supply voltage and said second supply voltage comprises a Vss power supply voltage.

9. The circuit of claim 6, further comprises:

a second transistor having a control terminal coupled to receive a first control signal, a first current handling terminal coupled to said control terminal of said first transistor and a second current handling terminal coupled to said first supply voltage; and a third transistor having a control terminal coupled to receive a second control signal, a first current handling terminal coupled to said control terminal of said first transistor and a second current handling terminal coupled to a second supply voltage;

wherein said first control signal and said second control signal are asserted for selectively driving said output signal of said first amplifier to said first supply voltage or said second supply voltage, respectively.

10. The circuit of claim 9, wherein said first and second transistors comprise p-type MOSFET transistor, said third transistor comprises an n-type MOSFET transistor, said first supply voltage comprises a Vdd power supply voltage and said second supply voltage comprises a Vss power supply voltage.

11. An error amplifier circuit comprising:

a differential amplifier receiving a first input signal and a second input signal, said differential amplifier generate an output signal across a first output terminal and a second output terminal indicative of the difference between said first input signal and said second input signal;

a cascode gain stage coupled to receive said output signal of said differential amplifier and generating a second output signal, said cascode gain stage including a first transistor receiving a first bias current and a second transistor receiving a second bias current, the first and second bias currents generated by a current mirror; and an amplifier receiving said second output signal from said cascode gain stage and generating a third output signal;

wherein said cascode gain stage is biased by a control signal for causing said current mirror to generate said first bias current having substantially constant magnitude over variations in voltage differences of said first input signal and said second input signal.

12. The circuit of claim 11, wherein said cascode gain stage comprises:

said first transistor having a control terminal coupled to a first node, a first current handling terminal receiving said first bias current and a second current handling terminal coupled to said first output terminal of said differential amplifier;

said second transistor having a control terminal coupled to said first node, a first current handling terminal receiving said second bias current and providing the second output signal and a second current handling terminal coupled to said second output terminal of said differential amplifier;

third and fourth transistors forming said current mirror, said third and fourth transistors having control terminal coupled to a second node, a first current handling terminal of the third transistor generating said first bias current and a first current handling terminal of the fourth transistor generating said second bias current;

a fifth transistor having a control terminal coupled to said second node, a first current handling terminal coupled to a first supply voltage and a second current handling terminal coupled to a third current mirror;

said third current mirror having an input terminal receiving said first bias current and an output terminal coupled to a third node;

a resistor coupled between said first node and said third node; and a reference curt source generating a reference current driving said first node;

wherein said reference current and said first bias current are compared at said first node for generating said control signal at said control terminals of said first and second transistors such that said first bias current flowing through said fist transistor is substantially constant over variations in voltage differences of said first input signal and said second input signal.

13. The circuit of claim 12, wherein said differential amplifier comprises:

a sixth transistor having a control terminal coupled to receive said first input signal, a first current handling terminal coupled to a third bias current and a second current handling terminal coupled to a second current mirror; and a seventh transistor having a control terminal coupled to receive said second input signal, a first current handling terminal coupled to said third bias current and a second current handling terminal coupled to said second current mirror, wherein said second current handling terminals of said first transistor and said second transistor form said first and second output terminals, respectively, of said differential amplifier.

14. The circuit of claim 13, wherein said second current mirror of said differential amplifier is coupled to receive a second control signal at said third node.

15. The circuit of claim 13, wherein said first and second transistors comprise n-type MOSFET transistors, said third, fourth and fifth transistors comprise p-type MOSFET transistors, said sixth and seventh transistors comprises p-type MOSFET transistors, and said first supply voltage comprises a Vdd power supply voltage.

16. The circuit of claim 11, wherein said amplifier comprises:

a third transistor having a control terminal receiving said second output signal from said cascode gain stage, a first current handling terminal coupled to a first supply voltage and a second current handling terminal coupled to a bias current source and providing said output signal; and a resistor and a capacitor connected in series between said control terminal and said second current handling terminal of said third transistor.

17. The circuit of claim 16, wherein said bias current source comprises a fourth transistor having a control terminal receiving a reference voltage, a first current handling terminal coupled to said second current handling terminal of said third transistor and a second current handling terminal coupled to a second supply voltage.

18. The circuit of claim 16, further comprises:

a fourth transistor having a control terminal coupled to receive a first signal, a first current handling terminal coupled to said control terminal of said third transistor and a second current handling terminal coupled to said first supply voltage; and a fifth transistor having a control terminal coupled to receive a second signal, a first current handling terminal coupled to said control terminal of said third transistor and a second current handling terminal coupled to a second supply voltage;

wherein said first signal and said second signal are asserted for selectively driving said output signal of said amplifier to said first supply voltage or said second supply voltage, respectively.

19. The circuit of claim 18, wherein said third and fourth transistor comprise p-type MOSFET transistors, said fifth transistor comprises an n-type MOSFET transistor, said first supply voltage comprises a Vdd power supply voltage and said second supply voltage comprises a Vss power supply voltage.

* * * * *